(12) United States Patent
Rioux et al.

(10) Patent No.: US 8,312,125 B1
(45) Date of Patent: Nov. 13, 2012

(54) SYSTEM AND METHOD FOR BULK WEB DOMAIN GENERATION AND MANAGEMENT

(75) Inventors: Adam Rioux, Rancho Palos Verdes, CA (US); Mark Roah, Rancho Palos Verdes, CA (US)

(73) Assignee: Local Corporation, Irvine, CA (US)

( * ) Notice: Subject to any disclaimer, the term of this patent is extended or adjusted under 35 U.S.C. 154(b) by 0 days.

(21) Appl. No.: 12/661,238

(22) Filed: Mar. 12, 2010

(51) Int. Cl.
G06F 15/16 (2006.01)
(52) U.S. Cl. ........................................ 709/223; 709/203
(58) Field of Classification Search .................... 709/223
See application file for complete search history.

(56) References Cited

U.S. PATENT DOCUMENTS

| | | | |
|---|---|---|---|
| 5,761,673 A | 6/1998 | Bookman et al. | |
| 6,026,433 A | 2/2000 | D'Arlach et al. | |
| 6,263,352 B1 | 7/2001 | Cohen | |
| 6,442,549 B1 * | 8/2002 | Schneider | 1/1 |
| 6,560,634 B1 | 5/2003 | Broadhurst | |
| 6,678,717 B1 * | 1/2004 | Schneider | 709/203 |
| 6,701,343 B1 | 3/2004 | Kenyon | |
| 6,738,950 B1 | 5/2004 | Barnett | |
| 6,873,957 B1 | 3/2005 | Chen et al. | |
| 6,980,990 B2 * | 12/2005 | Fellman | 1/1 |
| 7,000,028 B1 * | 2/2006 | Broadhurst et al. | 709/245 |
| 7,062,511 B1 | 6/2006 | Poulsen | |
| 7,299,299 B2 * | 11/2007 | Hollenbeck et al. | 709/245 |
| 7,356,534 B2 * | 4/2008 | Mohammed et al. | 1/1 |
| 7,565,402 B2 * | 7/2009 | Schneider | 709/203 |
| 7,668,913 B1 * | 2/2010 | Underwood et al. | 709/205 |
| 7,698,426 B2 * | 4/2010 | Thayer et al. | 709/225 |
| 7,743,093 B2 * | 6/2010 | Damour et al. | 709/203 |
| 7,752,260 B2 * | 7/2010 | King et al. | 709/203 |
| 7,761,566 B2 * | 7/2010 | Adelman et al. | 709/224 |
| 7,761,583 B2 * | 7/2010 | Shull et al. | 709/229 |
| 7,792,836 B2 * | 9/2010 | Taswell | 707/737 |
| 7,792,948 B2 * | 9/2010 | Zhao et al. | 709/224 |
| 7,814,141 B2 * | 10/2010 | Parsons et al. | 709/202 |
| 7,886,221 B1 * | 2/2011 | Underwood et al. | 715/234 |
| 7,904,898 B2 * | 3/2011 | King et al. | 717/171 |
| 2009/0313364 A1 * | 12/2009 | Parsons et al. | 709/223 |
| 2010/0023611 A1 * | 1/2010 | Yang et al. | 709/223 |
| 2010/0115043 A1 * | 5/2010 | King et al. | 709/206 |
| 2010/0174610 A1 * | 7/2010 | Del Real | 705/14.73 |
| 2010/0205551 A1 * | 8/2010 | Underwood et al. | 715/760 |
| 2010/0228759 A1 * | 9/2010 | Thomas | 707/758 |
| 2011/0060950 A1 * | 3/2011 | Waldron et al. | 714/48 |
| 2011/0066607 A1 * | 3/2011 | Wong | 707/706 |
| 2011/0179165 A1 * | 7/2011 | Ravichandran | 709/224 |
| 2011/0185053 A1 * | 7/2011 | Larson et al. | 709/223 |
| 2011/0191417 A1 * | 8/2011 | Rathod | 709/204 |
| 2011/0196715 A1 * | 8/2011 | Matkowsky | 705/7.29 |

* cited by examiner

Primary Examiner — Lynn Feild
Assistant Examiner — Melvin H Pollack
(74) Attorney, Agent, or Firm — Nixon Peabody LLP

(57) ABSTRACT

A system and method for enabling networked computer users to bulk create and manage multiple web domains is disclosed. A particular embodiment includes collecting, by use of a processor, a set of domain names for bulk content development, at least one domain name of the set of domain names being derived from a user-provided keyword; filtering the set of domain names based on network search matching; automatically submitting at least one domain name of the set of domain names for purchase by a domain purchase agent; applying a template to pages of a plurality of sites, each site corresponding to a domain name of the set of domain names; and inserting a plurality of content items into the pages of the plurality of sites, at least one of the plurality of content items being an original content item retrieved from an original content portal.

19 Claims, 43 Drawing Sheets

SYSTEM AND METHOD FOR BULK WEB DOMAIN GENERATION AND MANAGEMENT

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008-2010 Octane360, All Rights Reserved.

TECHNICAL FIELD

This non-provisional patent application relates to computer networking and management of networked sites, according to one embodiment, and more specifically, to enabling networked computer users to bulk create and manage multiple web domains.

BACKGROUND

The content available to networked computer users has increased significantly in recent years. This content is typically provided and accessed via websites on the Internet. A website is a location on a data network, such as the World Wide Web (available via the Internet, an intranet, or extranet), which is accessible remotely and contains information which is viewable through a networked user's personal computer. The web pages provided on a website may contain text, graphics, images, sound, video, etc. and are generally written in a standard page or hypertext document description language known as the Hypertext Markup Language (HTML). The HTML format allows a web page developer to specify the location and presentation of the graphic, textual, sound, etc. on the screen displayed to the user accessing the web page. In addition, the HTML format allows a web page to contain links, such as hypertext links, to other web pages or servers on the Internet. Simply by selecting a link, a user can be transferred to the new web page, which may be located in a very different geographical or topological location from the original web page. Web pages are typically individually created for particular purposes and access to a particular web page may be limited to selected parties.

Web sites can be intricate and may require thousands of hours to develop and maintain. Businesses and individuals can incur significant costs in this process and may dedicate a substantial number of people towards a website's development and maintenance. Often large companies have subsidiaries or offices that require their own web sites. It is beneficial for these organizations to maintain a similar appearance of subsidiary websites to the parent or primary web site. However, the subsidiaries may need to exhibit different behaviors. Independently creating each of these sites often means expensive development costs for the parent or primary company. Furthermore, creating sites independently is complicated and error-prone if a subsidiary site is in a foreign language or involves different user options.

BRIEF DESCRIPTION OF THE DRAWINGS

The various embodiments is illustrated by way of example, and not by way of limitation, in the figures of the accompanying drawings in which.

DETAILED DESCRIPTION

Figure 1:
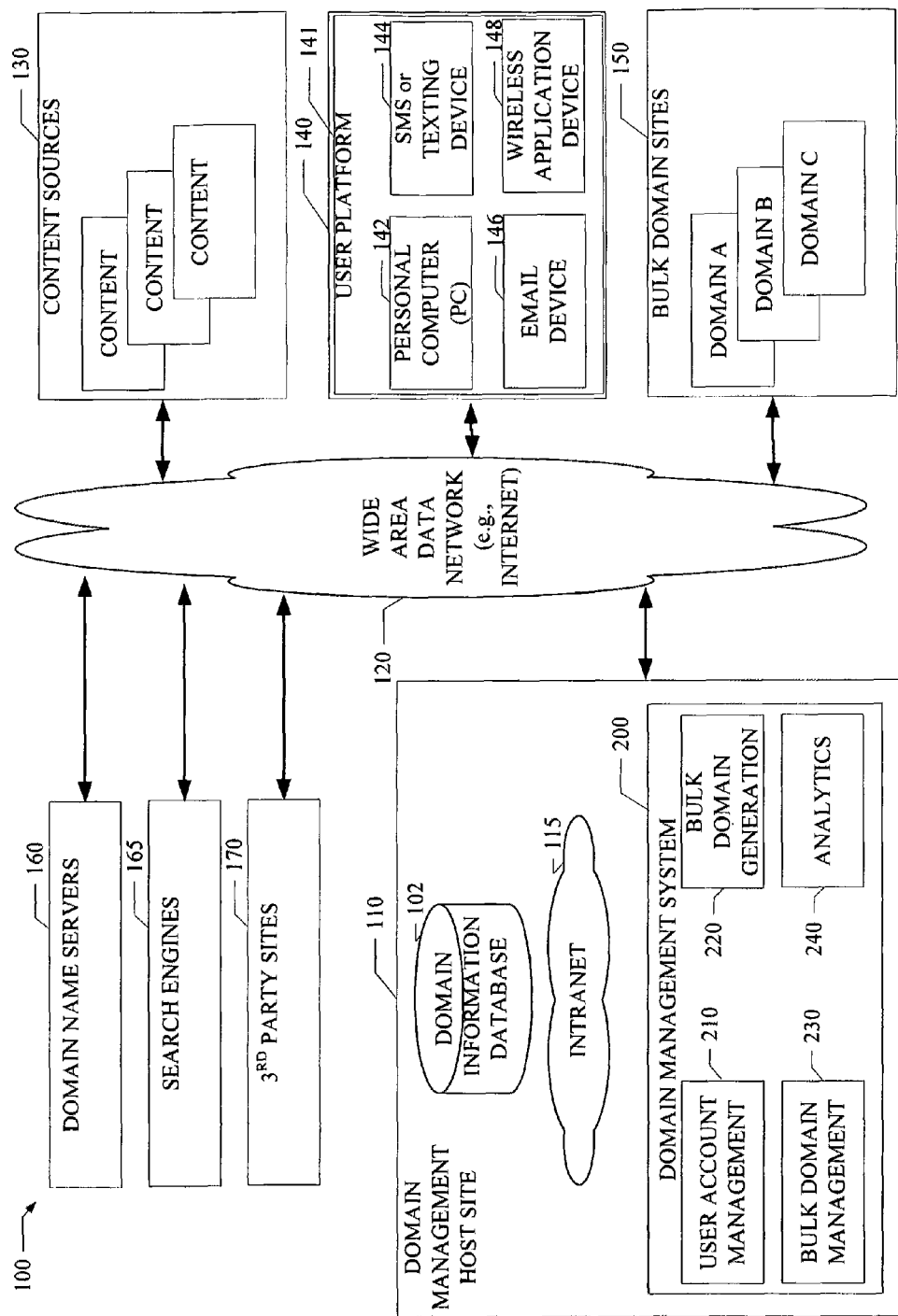
FIG. 1 illustrates an example embodiment of a system and method for enabling networked computer users to bulk create and manage multiple web domains.

In the following description, for purposes of explanation, numerous specific details are set forth in order to provide a thorough understanding of the various embodiments. It will be evident, however, to one of ordinary skill in the art that the various embodiments may be practiced without these specific details.

Domain names are commonly used as simple identification labels to indicate ownership or control of a network resource. Typically, these resources are data network resources, such as websites on the Internet. Individual Internet host computers can use domain names as host identifiers, or hostnames. Hostnames are typically the leaf labels in the conventional domain name system. Hostnames can appear as a component in Uniform Resource Locators (URLs) for Internet resources such as web sites. An important purpose of domain names is to provide easily recognizable and memorizable names to numerically addressed Internet resources. This abstraction allows any resource (e.g., a website) to be moved to a different physical location in the address topology of the network, globally or locally in an intranet. Such a move usually requires changing the Internet Protocol (IP) address of a resource and the corresponding translation of this IP address to and from its domain name. Domain names are often referred to simply as domains and domain name registrants are frequently referred to as domain owners.

In the various embodiments described herein, a system and method for enabling networked computer users to bulk create and manage multiple web domains is disclosed. In various embodiments described in more detail below, a networked environment is used to enable a web domain service to provide networked computer users with web domain generation and management services. The web domain service of an example embodiment also provides networked content providers with services to create original content for the web domains created and maintained by other users. This networked environment and the web domain service or host of an example embodiment are described in more detail below. Initially, a list of the basic functionality provided by a web domain host of an example embodiment is set forth next.

Bulk Domain Generation

A particular embodiment provides bulk domain creation and collection based on relevant keywords (e.g., user provided and automatically generated keywords or keyword phrases) and based on a user-configured template.

Domain Selection

1. Bulk List: If a user has a list of domains s/he wants to buy, the user can paste the desired domain names into our domain marketplace and buy them at one time or collectively. Then, the user can apply a template to the set of purchased domain names at one time.
2. Term Expander: A user can use our term expander tool to combine a keyword or keyword phrase with some pre-packaged lists, such as states, cities, careers, auto terms, etc. Additionally, the term expander of a particular embodiment may include Radius and Population Domain Creation. In this embodiment, a user can select a keyword and postal zip code (or other geographic designator) and the system can apply a specific radius to the user's query. The system can combine the keyword with every city or town (of a pre-configured size) within that specific zip code radius and determine if the combined domain is available for registration. The system can additionally display each locale's zip code, population, metro population, business entity population and score the domain based on amount of potential Internet users that may search for the keywords within the domain.
3. Network Search Matching: A user can buy domains built from related keyword phrases found by tapping into third party search databases. The idea is to find domains that have the exact term people are using to search, plus only selecting domains that the user knows have enough monthly searches to make it worth the effort. This tool helps the user to not buy blindly or rely on mere estimates of traffic. This tool enables a user to buy domains built from related keyword phrases that search engines have determined people are actually using to search.
4. Existing domains already bought by a user can be added to the system by pointing their DNS (domain name server) to the web domain host of an example embodiment.

Bulk Domain Development

Domains can be built in bulk in various degrees of complexity.

1. Bulk Template Replication: Bulk domain development can replicate a single user-configured template across multiple domains. The template can be applied after the user selects and purchases/identifies the set of domains to which the template will be applied. A Simple Bulk Uploader can be applied to the domain set. Additionally, an Advanced Bulk Uploader can be applied to the domain set to allow rapid customization, thereby enabling all domain sites to be unique.
2. Bulk Content Fetch Process: Often the inclusion of unique meta tags with the long tail nature of these domains is enough to achieve first page ranking. Usually original content is required for the search engines to rank a domain long term. Our process puts content requests in front of professional writers in a quick and easy way. Built in quality controls help a domain owner feel comfortable that the content they buy and include in a domain site webpage is high quality. These quality controls in an example embodiment include the following: all content is passed through a plagiarism filter, spell/grammar check and eventually approved or rejected by the responsible party (e.g., the requesting user). Writers log into our content portal, select articles, write and submit them. The responsible party receives an email that content is ready for review. If there are problems, the responsible party can reject the article and send it back with notes for a revision. If the content is approved, the responsible party accepts the article and the article becomes live on the domain site in the exact page for which the content was requested.
3. Custom Logo: Custom logos can be built using our tool. A user can customize an icon with formatted text to build a logo appropriate for use on a domain site.

Bulk Domain Management

Creating sites in bulk is great, but we also have a way to edit and manage existing sites in mass too.

Mass Edits

1. Bulk Edits: The user can select an item in a particular site that the user wants to change (e.g., add a page, change an image, change a color scheme, change a zone, edit keywords, etc.). Then, the user can select all the domains to which the edit should apply. Automatically, all the specified changes are replicated across the selected domains and become live on the sites.
2. Bulk management tools. A particular embodiment also provides several tools for managing and gathering information from a set of domains. For example, these tools can include DNS validation, submit site map, ping search engines, analytics upload, and the like.

In various embodiments described in more detail below, a networked environment is used to enable a web domain service to provide networked computer users with web domain generation and management services. This networked environment and the web domain service or host of an example embodiment is described next.

Referring now to FIG. 1, in an example embodiment, a system and method for enabling networked computer users to bulk create and manage multiple web domains is disclosed. In various example embodiments, an application or service, typically operating on a host site (e.g., a website) 110, is provided to simplify and facilitate web domain generation and management for a user at a user platform 140. Content sources 130 provide a plurality of content sources from which content items (e.g., documents, text, links, images, video/audio clips, graphics, animations, executable code, widgets, etc.) for inclusion in a webpage may be obtained. One or more of the content sources 130 can be provided by one or more content publishers or content aggregators operating at various locations in a network ecosystem. Additionally, as described in more detail below, one or more of the content sources 130 can be content portals through which a particular embodiment can enable $3^{rd}$ party authors to prepare and submit original content for inclusion in a webpage of a domain site built using the functionality described herein. In a particular embodiment, a list maintained at the host site 110 can be used as a summary or list of all content portals implemented as content sources 130, which are available to domain creators at user platforms 140. It will be apparent to those of ordinary skill in the art that content sources 130 can be any of a variety of networked content providers or content aggregators as described in more detail below.

The domain management (host) site 110, content sources 130, and user platforms 140 may communicate and transfer content and information in the data network ecosystem shown in FIG. 1 via a wide area data network (e.g., the Internet) 120. Various components of the domain management site 110 can also communicate internally via a conventional intranet or local area network (LAN) 115.

Networks 120 and 115 are configured to couple one computing device with another computing device. Networks 120 and 115 may be enabled to employ any form of computer readable media for communicating information from one electronic device to another. Network 120 can include the Internet in addition to LAN 115, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a modem and temporary telephone link.

Networks 120 and 115 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 115 may also include an autonomous system of terminals, gateways, routers, and the like connected by wireless radio links or wireless transceivers. These connectors may be configured to move freely and randomly and organize themselves arbitrarily, such that the topology of networks 120 and 115 may change rapidly and arbitrarily.

Networks 120 and 115 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 115 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 115 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, networks 120 and 115 may include virtually any wired and/or wireless communication mechanisms by which information may travel between one computing device and another computing device, network, and the like. In one embodiment, network 115 may represent a LAN that is configured behind a firewall (not shown), within a business data center, for example.

The content sources 130 may include any of a variety of providers of network transportable digital content, some of which may be RSS (Really Simple Syndication) feeds, denoted generally as content or content items. The network transportable digital content can be transported in any of a family of file formats and associated mechanisms usable to enable a host site 110 and a user platform 140 to receive content from a content source 130 over a network 120. In one embodiment, the file format can be XML (Extensible Markup Language), however, the various embodiments are not so limited, and other file formats and transport protocols may be used. For example, content formats other than HTML/XML or formats other than open/standard feed formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein. Furthermore, although RSS content can be used, the various embodiments are not limited to RSS. For example, Atom, a syndication specification adopted by the Internet Engineering Task Force (IETF) may also be employed. As used throughout this application, including the claims, RSS refers to RSS, Atom, and other syndication file formats derived therefrom. Moreover, a particular content source 130 may provide more than one content item or content feed.

In a particular embodiment, a user platform 140 with one or more client devices 141 enables a user to bulk create and manage multiple web domains and develop the web domains using content from the content sources 130 as facilitated by the host 110 via network 120. Client devices 141 may include virtually any computing device that is configured to send and receive information over a network, such as network 120. Such client devices 141 may include conventional personal computers (PCs) 142, portable devices 144, 146, or 148 such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 implemented as personal computers 142 can include multiprocessor systems, microprocessor-based or programmable consumer electronics, desktop or laptop computers, network PC's, and the like. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and/or send digital information.

Client devices 141 may also include at least one client application that is configured to receive control data and/or content from another computing device via a network transmission. The client application may include a capability to provide and receive textual content, graphical content, video content, audio content, and the like. Moreover, client devices 141 may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between or with another computing device, and the like.

Referring still to FIG. 1, host site 110 of an example embodiment is shown to include a domain management system 200, which includes a user account management module 210, a bulk domain generation module 220, a bulk domain management module 230, and an analytics module 240. Each of these modules can be implemented as software components executing within an executable environment of domain management system 200 operating on host site 110. Host site 110 is also shown to include a domain information database 102 in which domain and user information can be stored as described in more detail below. Each of these components of an example embodiment is described in more detail below in connection with the figures provided herein.

Figure 2:
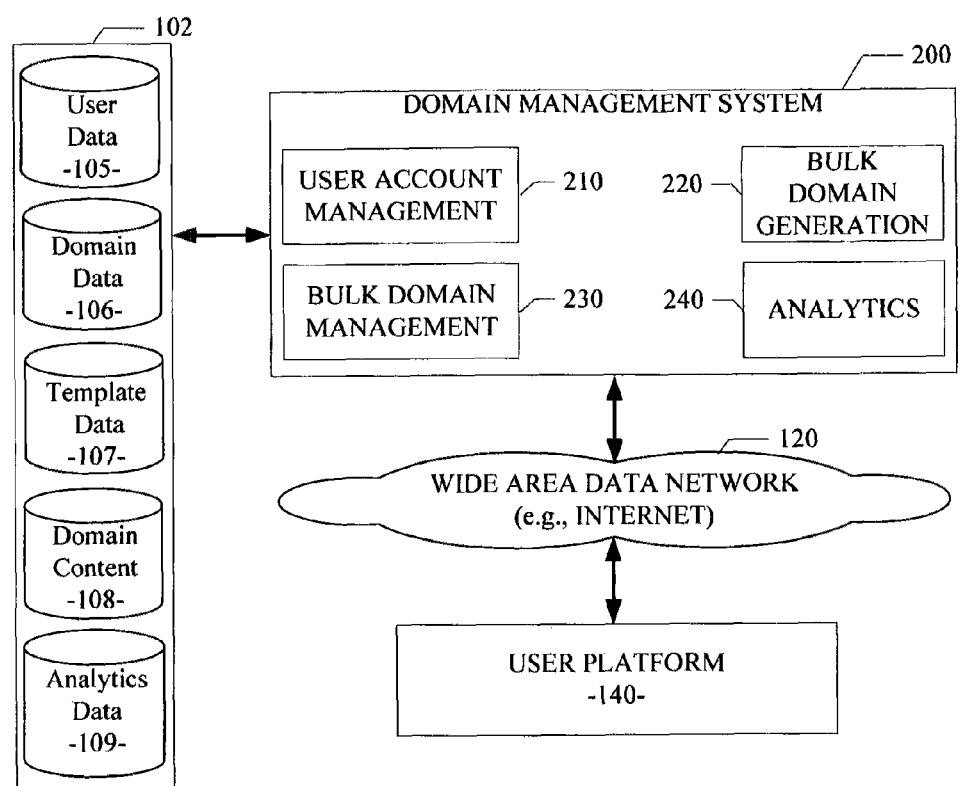
FIG. 2 illustrates a system diagram of the domain management system of an example embodiment.

Referring now to FIG. 2, a system diagram of the domain management system 200 of an example embodiment is illustrated. As shown, user platform 140 is in data communication via network 120 with the processing modules 210-240 of the domain management system 200. The domain management system 200 is in data communication with the database 102, in which user data 105, domain data 106, template data 107, domain content 108, and analytics data 109 can be stored and accessed. In general, the domain management system 200 can provide domain management services to users at user platforms 140 via network 120 as described in more detail below.

The domain management system 200 may communicate and transfer content and information in the network ecosystem via a wide area data network (e.g., the Internet) 120. In this manner, the domain management system 200 may communicate and transfer content and information with a user of a user device 141 of user platform 140. In general, the user can interact with the domain management system 200 via a graphical user interface (GUI) implemented in an example embodiment as a set of webpages described in more detail below.

As shown in FIG. 2, the domain management system 200 of an example embodiment provides a user account management module 210. The user account management module 210 provides the functionality and interfaces for a user to register with the host site 110 and create, modify, and manage a user account and related user information profiles and data sets. As part of the creation of a user account, a user can assign a unique identifier (also denoted a user identifier or user ID) to the user account and related user information data sets. Alternatively, the user account management module 210 can automatically create and assign the user ID to the user account and related user information data sets. In one embodiment, the user ID can be a unique fixed length numeric string. In an alternative embodiment, the user ID can be an alphanumeric string of arbitrary length, which can be used to uniquely identify a particular user account and related user information data sets. The user profile and information data sets can be stored in user database portion 105.

Once the user ID is created using any of the embodiments described above, the user ID can be provided by a user to access and configure user-specific information in a user information data set retained on host site 110 in a conventional manner. In a particular embodiment, a user profile can be created and maintained in user data 105. The user profile can be used to establish a user context in which user-specific information, such as demographics, affinity, search history, transaction history, and the like can be maintained. Additionally, domain data for particular users can be maintained by user account management module 210. This domain data can include, for example, identifiers of domains created and/or purchased by a particular user, domain keywords used for creating domains, user topics of interest, and the like. It will be apparent to those of ordinary skill in the art that other user information may similarly be configured and retained in user data 105 by the user account management module 210. Thus, for various embodiments, a user can register with the host site 110 and use host site 110, and the user account management module 210 therein, to create and maintain a user profile, user information data sets, user context information, and a corresponding unique user ID.

Figure 3:
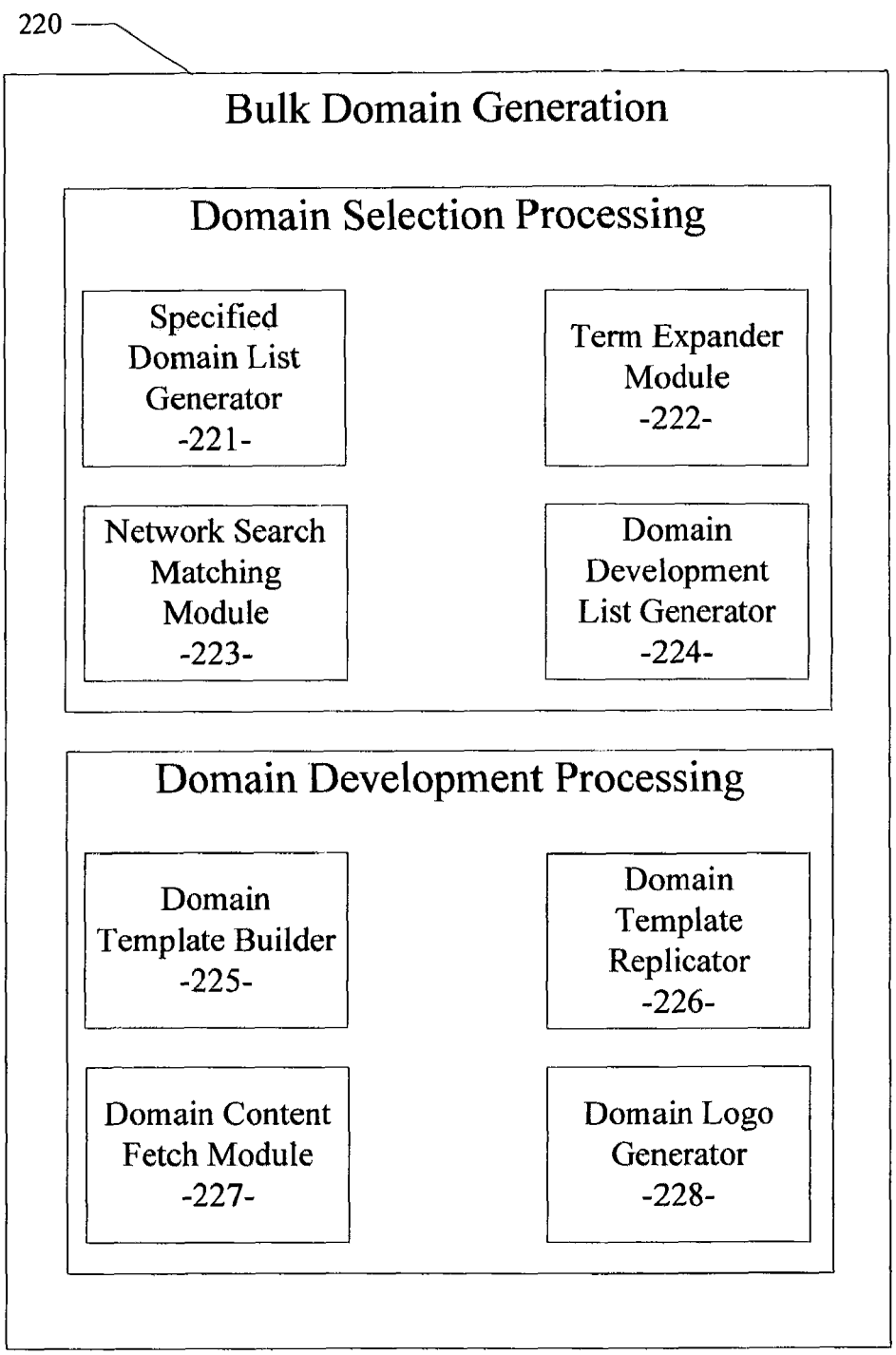
FIG. 3 illustrates a detail of the processing modules included in the bulk domain generation module of an example embodiment.

Referring still to FIG. 2, the bulk domain generation process performed by the bulk domain generation module 220 of an example embodiment can include identifying and obtaining desired domains and developing unique content for each of the new domains in a bulk processing fashion. FIG. 3 illustrates a detail of the processing modules included in the bulk domain generation module 220 of an example embodiment.

Referring to FIG. 3, the bulk domain generation module 220 of an example embodiment includes two basic sets of functional components. A set of domain selection modules 221-224 assist a user in the searching, selection and acquisition of a desired set of domain names. A second set of domain development processing modules 225-228 provide tools with which a user can develop and deploy unique content for each of the new domains acquired by the domain selection modules 221-224. As shown in FIG. 3, the domain selection processing modules of an example embodiment include a specified domain list generator 221, a term expander module 22, a network search matching module 223, and a domain development list generator 224. The operation and processing of these domain selection processing modules are shown in more detail in FIG. 5.

Figure 5:
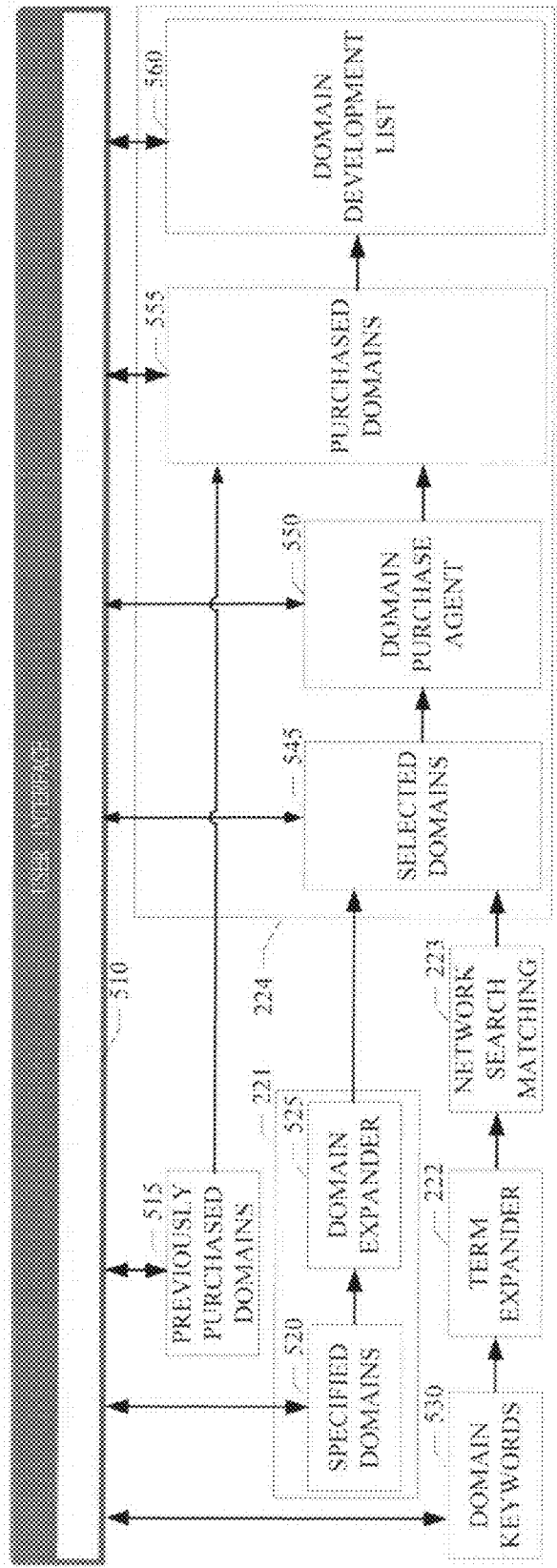
FIG. 5 illustrates the operation and processing of the domain selection processing modules of an example embodiment.

Referring now to FIG. 5, the operation and processing of the domain selection processing modules 221-224 are illustrated. In a particular embodiment, a user interface 510 is provided to enable a user of user platform 140 to interact with and efficiently configure the operation of the domain selection modules 221-224. This user interface 510 can be implemented, for example, as a series of web pages presented to a user by the domain management system 200.

A user of the domain management system 200 typically wants to search, select, and acquire a desired set of domain names. Initially, the user may already have acquired/purchased one or more domain names s/he wishes to include in a set of domain names that can be developed in bulk fashion using the domain development processing modules 225-228 described below. In this case, the user can provide these previously acquired/purchased domain names to the previously purchased domains module 515 via user interface 510 as shown in FIG. 5. These previously purchased domain names can be added to a list of purchased domains 555 as collected by the domain development list generator 224.

Secondly, the user may already have identified one or more specific domain names s/he wishes to acquire and include in the set of domain names that can be developed in bulk fashion using the domain development processing modules 225-228 described below. For example, the user may know that s/he wants to own the domain name www.xyz.com, if such domain name is available. In this case, the user can provide these specific domain names to the specified domains module 520 via user interface 510 as shown in FIG. 5. The specified domains module 520 can be provided as part of the specified domain list generator 221 as shown in FIG. 3. The specified domain list generator 221 can include a domain expander module 525, which can expand the specific domain name provided by the user to include domain names with related extensions, geographic designations, technology designations, and the like (e.g., www.xyz.org, www.xyz.edu, www.xyz.net, www.xyz.jp, etc.). The expanded specific domain list can be provided to a selected domain module 545 that collects desired domain names as selected by the user for purchase.

Thirdly, the user may have identified one or more keywords, keyword phrases, search terms, topics, concepts, trademarks, or other related words or the like that may correspond to domain names s/he wishes to acquire and include in the set of domain names that can be developed in bulk fashion using the domain development processing modules 225-228 described below. In support of this keyword-based domain name selection process of an example embodiment, a domain keyword module 530 receives the keywords, keyword phrases, and the like as entered by the user via user interface 510. These keywords or keyword phrases can include any alphanumeric string the user believes may form an appropriate and useful association between a particular product/service/information offering and a corresponding domain name supporting the offering. The various embodiments provide tools for the user to develop these user-provided keywords or keyword phrases into corresponding domain names. In one embodiment, a term expander 222 can process the user-provided keywords or keyword phrases and derive recommended domain names. As part of this processing, the term expander 222 can parse the user-provided keywords or keyword phrases to isolate particular primitives, such as words, word portions, or strings. These primitives can be further processed by re-arranging the primitives into a different order, substituting synonyms for particular primitives, adding additional strings, and/or the like. For example, a user might enter the keyword phrase, "house for sale." In response to receiving this sample keyword phrase, the term expander 222 can produce the following recommended domain names: houseforsale.com, house-for-sale.com, house4sale.com, homeforsale.com, etc. It will be apparent to those of ordinary skill in the art that a variety of different recommended domain names can be produced by the term expander 222 in response to receiving a user-provided keyword or keyword phrase. A user interface option is provided whereby the user can selectively activate or deactivate the use of synonyms in the term expansion process. Further, the recommended domain names can be produced by the term expander 222 by combining a keyword or keyword phrase with some prepackaged lists, such as states, cities, careers, auto terms, etc. Additionally, the term expander 222 can filter the recommended domain names based on the user context. For example, the recommended domain names can be limited to only those domain names associated with the particular user's geographic location, selected product/service category, temporal parameters, and the like. The term expander of a particular embodiment may include Radius and Population Domain Creation. In this embodiment, a user can select a keyword and postal zip code (or other geographic designator) and the system can apply a specific radius to the user's query. The system can combine the keyword with every city or town (of a pre-configured size) within that specific zip code radius and determine if the combined domain is available for registration. The system can additionally display each locale's zip code, population, metro population, business entity population and score the domain based on amount of potential Internet users that may search for the keywords within the domain. In summary, the term expander 222 can produce a set of recommended domain names that are most likely relevant to a particular user's needs.

As part of the term expansion process, or subsequent thereto, the set of recommended domain names can be further filtered or ordered based on network search matching. The network search matching module 223 is provided for this purpose. The network search matching module 223 compares the user-provided keyword or keyword phrase and/or the set of recommended domain names with the search queries submitted to $3^{rd}$ party sites and/or $3^{rd}$ party search engines. The idea is to recommend domain names that correspond to the search terms people are using to search, plus only recommending domains that correspond to the search terms people are using to search on a frequent enough basis. This tool helps the user to not buy blindly or to merely rely on estimates of traffic. The network search matching module 223 enables a user to buy domains built from related keyword phrases that the search engines have determined people are using to search. As a result, the domain names recommended by the term expander 222 and the network search matching module 223 are likely to be of high value for a particular user. The network search matching module 223 can automatically communicate with commonly known search engines (e.g., search engines 165 shown in FIG. 1) using well-known network interfaces. The network search matching module 223 can submit the keyword phrases entered by the user to the search engine. In response, the search engine provides information including a number of searches performed on the search engine using the user-entered keyword phrases. The search engine can also provide information including a number of searches performed on the search engine using the expanded keyword phrases. In this manner, the network search matching module 223 can determine the keyword phrases that are most commonly entered into the search engine. These most commonly used keywords, as determined from actual search engine traffic, can represent the best domain name candidates that may be valuable for the user. These recommended domain names can be provided to the selected domains module 545.

Once the specific domain names and recommended domain names have been collected by the selected domain module 545, the user can have an opportunity to select or reject the collected domain name candidates in the selected domain module 545 via user interface 510. Additionally, the collected domain names can be checked for availability for purchase. After the user has identified a set of selected domain names in the selected domain module 545 s/he wishes to purchase, these selected domain names can be sent to a domain purchase agent 550. Using conventional technology, the domain purchase agent 550 can use automated processes to submit each of the selected domain names to a $3^{rd}$ party domain provider for purchase. Following the processing by the $3^{rd}$ party domain provider, the domain purchase agent 550 can generate a data structure or report identifying each of the selected domain names along with status information indicating whether or not the purchase of the particular selected domain name was successful. The user can be notified of these results via user interface 510. Additionally, the domain purchase agent 550 can forward the names of the successfully purchased domains to a purchased domains module 555. The domains successfully purchased by the domain purchase agent 550 can be combined with the domain names previously purchased by the user as provided by module 515. The purchased domains module 555 can be used to collect these purchased domain names. Once the purchased domain names have been collected by the purchased domains module 555, the user can have an opportunity to select or reject the purchased domain names in the purchased domains module 555 via user interface 510. At this point, the user can select from among the purchased domain names in the purchased domains module 555 for development of content for the selected purchased domain names. After the user has identified a set of selected purchased domain names for which s/he wishes to develop content, these selected purchased domain names can be collected in a domain development list 560. Thus, the domain names in the domain development list 560 represent the domain names the user has identified (via prior purchase, specific naming, or keyword searching), purchased, and selected for content development. The domain development list 560 represents the output produced by the domain development list generator 224 and a primary output of the bulk domain selection process of an example embodiment. At this point, the selected purchased domain names collected in the domain development list 560 are ready to be developed into one or more families of fully functioning websites, each with unique content and consistent formatting and coloration using the bulk domain development processing modules shown in FIGS. 3 and 6.

Referring again to FIG. 3, the bulk domain development processing modules 225-228 of the bulk domain generation module 220 of an example embodiment are shown. The domain development processing modules 225-228 provide various tools with which a user can develop and deploy unique content for each of the domains acquired by the domain selection modules 221-224. As shown in FIG. 3, the domain development processing modules of an example embodiment include a domain template builder 225, a domain template replicator 226, a domain content fetch module 227, and a domain logo generator 228. The operation and processing of the domain development processing modules are shown in more detail in FIG. 6.

Figure 6:
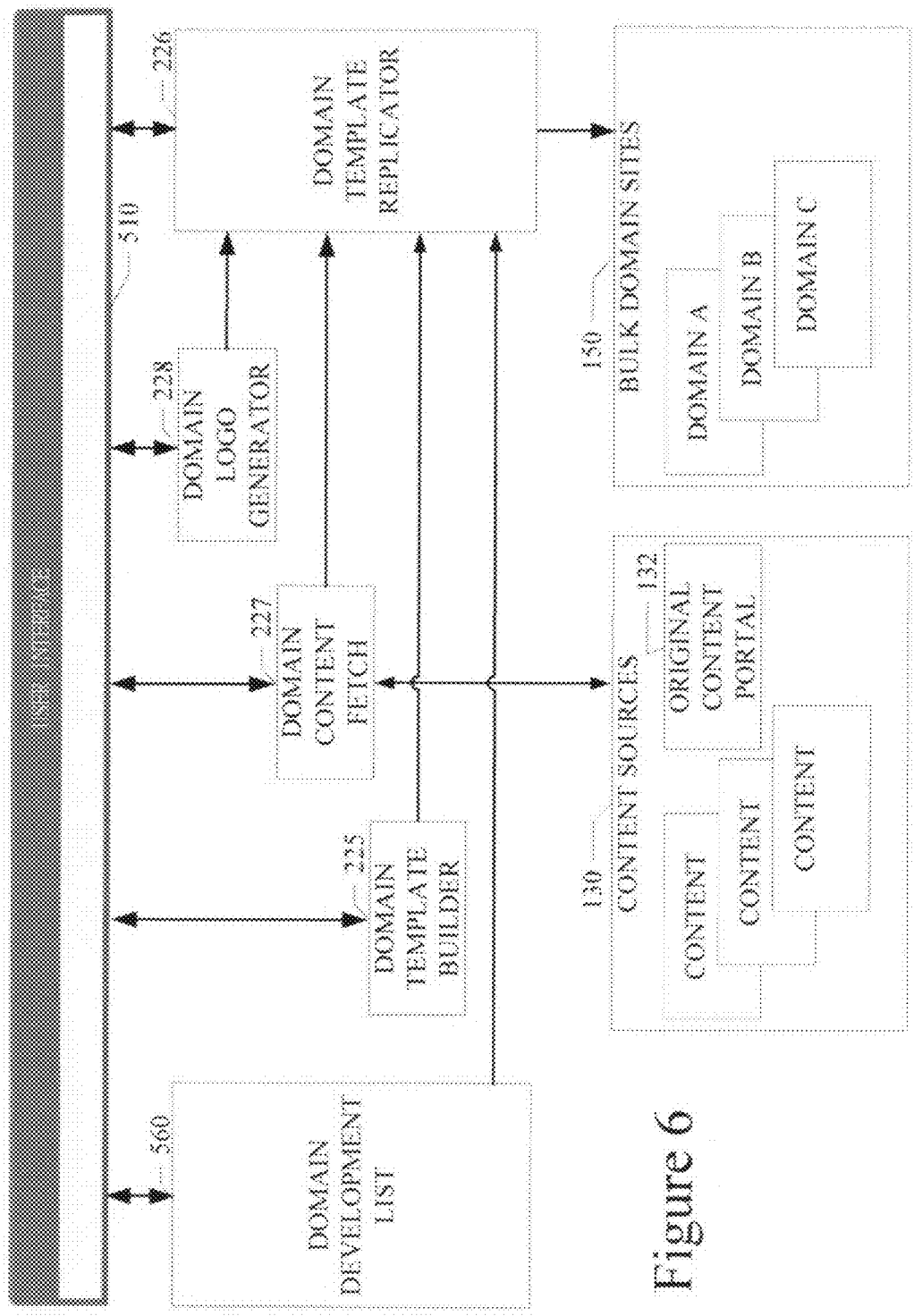
FIG. 6 illustrates the operation and processing of the domain development processing modules of an example embodiment.

Referring now to FIG. 6, the operation and processing of the domain development processing modules 225-228 are illustrated. In a particular embodiment, the user interface 510 is provided to enable a user of user platform 140 to interact with and efficiently configure the operation of the domain development processing modules 225-228.

As described above, the user can collect a set of selected purchased domain names in the domain development list 560. The domain names collected therein are ready to be developed into one or more families of fully functioning websites, each with unique content and consistent formatting, coloration, styling, and the like. Initially, the user can use domain template builder 225 to generate a site template. The template is used as a framework or generic design from which the customized pages for a particular website can be generated. The template can be parameterized to provide various formatting, coloration, and styling options from which a user can choose a particular page layout, data display and entry fields, and color or image options. The template can include pre-defined site configuration data/parameters and user-specified site configuration parameters, which can be specified by a host 110 administrator and/or a user via the user interface 510. The generated templates can be stored in template data area 107 of database 102. In this manner, the user can employ the domain template builder 225 to generate one or more site templates that can be used later to bulk customize the presentation of sites corresponding to the family of selected purchased domain names.

In an example embodiment, templates can be generated as an extension to the active server page technology. The templates, which can be referred to as "active server templates", can be generated as a combination of hypertext language and scripting language. The active server templates are thereby similar to active server pages (ASPs). However, unlike ASPs, the active server templates specify an additional, higher order scripting level that specifies a second level of code. During creation of content for a site corresponding to a domain name, a page generator can read an active server template file and convert the template to a scripting program having executable lines of code derived from the higher-order level of instructions. The page generator then executes the scripting program using pre-defined site configuration data and user-specified site configuration parameters as input to produce a customized active server page. The resulting active server page contains the hypertext language and the lower-order level of instructions in the scripting language that can be deployed on the site corresponding to a particular domain name.

Once a page layout, coloration format, and styling is specified using the domain template builder 225, the content of the site pages can be specified using the domain content fetch module 227. The domain content fetch module 227 of an example embodiment can be configured by a user to access system-configured or user-specified content sources 130 and obtain particular content items therefrom. For example, the domain content fetch module 227 can be configured to access a particular document or page at a specified uniform resource locator (URL) or network address and to retrieve the identified document, page, or other content item. The retrieved content item can then be inserted into a particular location of a particular page of a site being generated by the domain template replicator 226. A user-specified template can be used by the domain template replicator 226 to determine the proper placement of the content item retrieved by the content fetch module 227. A plurality of content items can be retrieved from a plurality of content sources 130 and inserted into a plurality of pages and sites being developed by the domain template replicator 226.

It is beneficial to create domain site content that is likely to rank highly with the most commonly used search engines. Domains with highly ranked content will be more likely included in search results and therefore viewed by a greater number of network users. Often the inclusion of unique meta tags with the long tail nature of these domains is enough to achieve first page ranking. Usually original content is required for the search engines to rank a domain long term. However, it is difficult to develop a plurality of sites in bulk fashion while providing original content on each of the sites. As described herein, a particular embodiment can put original content requests in front of professional writers in a quick and easy way. In this manner, original content can be generated and automatically inserted on each site of a plurality of sites in bulk fashion.

Referring again to FIG. 6, a particular embodiment provides an original content portal 132, which can be implemented as one of the network accessible content sources 130. In a particular embodiment, the original content portal 132 is operated as a separate website on which professional writers may create accounts and log in. As part of the domain development process, the user can specify the types of original content the user wants to insert into a set of domain sites being created by the bulk domain generation module 220. For example, the user can specify particular topics, concepts, questions, research specifications, and the like that can provide a professional writer with enough information to write a related body of original content. These user content specifications can be captured by the domain content fetch module 227 and converted to content requests that are sent to the original content portal 132. The content requests are posted on the original content portal 132. When professional writers log in to the original content portal 132, the writers can view the open content requests and select one or more of the content requests to which the writer can respond. At this point, the writer prepares a body of original content that is both responsive to the content request and conforms to the content parameters established by the original content portal 132 and/or host site 110. The writer can then submit the newly-drafted original content to the domain content fetch module 227. The domain content fetch module 227 can notify the requesting user of the receipt of the original content from the original content portal 132. The user can accept the received content or return the content back to the writer via the original content portal 132 for further revision/editing. Once the user accepts the original content from the original content portal 132, the domain content fetch module 227 can forward the approved original content to the domain template replicator 226 for insertion into an appropriate page of a site being developed by the domain template replicator 226. As described above, a user-specified template can be used by the domain template replicator 226 to determine the proper placement of the original content item retrieved by the content fetch module 227. A similar process can be used to insert original content into a plurality of sites being developed by the domain template replicator 226 in bulk fashion. After the user accepts the original content from the original content portal 132, the writer of the content can be automatically credited or compensated using pre-defined criteria as established on the original content portal 132 and/or the host site 110.

In a particular embodiment, the original content portal 132 includes quality controls help a user/domain owner feel comfortable that the content they buy and include in a domain site webpage is high quality. These quality controls in an example embodiment include the following: all content is passed through a plagiarism filter, spell/grammar check and eventually approved or rejected by the requesting user. Writers log into the original content portal 132, select content requests, write corresponding content, and submit the content to the requesting user. The requesting user can receive an email or other form of notification that content is ready for review. If there are problems, the requesting user can reject the content and send it back to the writer with notes for a revision. If the content is approved, the requesting user accepts the content and the content becomes live on the domain site at the corresponding page for which the content was requested.

Referring again to FIGS. 3 and 6, a particular embodiment includes a domain logo generator 228. The domain logo generator 228 can be used to automatically generate an original logo for a particular domain site based on input provided by a user via user interface 510. For example, the user can provide a logo, keyword, image, icon, graphic, or the like to the domain logo generator 228. The domain logo generator 228 can receive the user input, customize and format the input to conform to the template parameters for the corresponding site, generate an original logo from the customized input, and insert the original logo into one or more pages of the corresponding domain site. In this manner, various embodiments can create and insert customized logos into domain site pages in bulk fashion.

The domain template replicator 226 of a particular embodiment includes a capability for bulk domain development wherein a single user-configured template is replicated across multiple domains. The template can be applied after the user identifies, selects, and purchases the set of domains to which the template will be applied. As a result of the processing operations described herein, a set of domain sites 150 can be created by domain template replicator 226, wherein the content of the domain sites 150 is fully developed with original content and domain logos.

A Simple Bulk Uploader can be applied to the domain set. Additionally, an Advanced Bulk Uploader can be applied to the domain set to allow rapid customization, thereby enabling all domain sites to be unique.

The bulk domain development process performed by the bulk domain generation module 220 can also include performing any transcoding, decompression, decryption, formatting, and/or the like that may be necessary to display a particular content item on a webpage of a created domain site. The bulk domain development process performed by the bulk domain generation module 220 can also include the fetching, staging, and deployment of particular content items on a webpage as users of user platforms 140 configure a particular set of domains with particular content items as described herein. The content (or links thereto) of the domains developed by the bulk domain generation module 220 can be stored in the domain content area 108 of database 102. Thus, as described herein in reference to various example embodiments, the bulk domain generation module 220 can assist a user to identify, select, acquire, and develop a plurality of domain sites 150 in bulk fashion.

Figure 4:
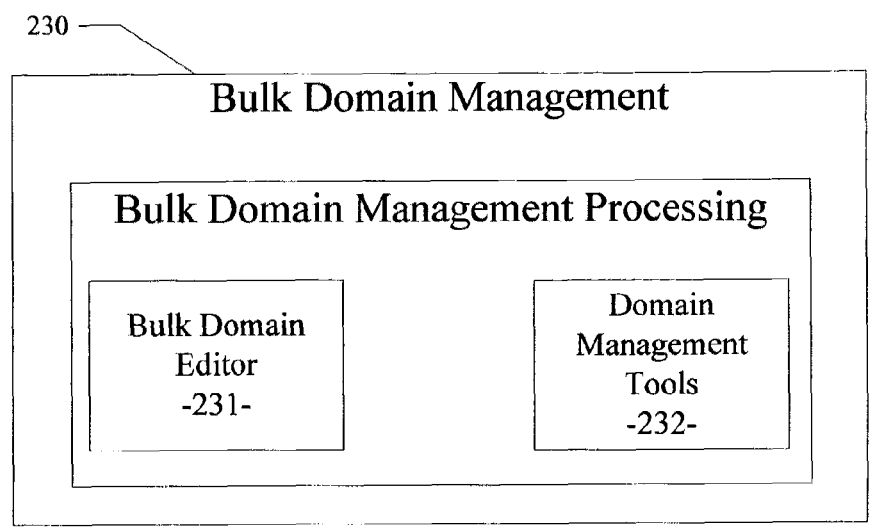
FIG. 4 illustrates a detail of the processing modules included in the bulk domain management module of an example embodiment.

Referring again to FIG. 2, the bulk domain management process performed by the bulk domain management module 230 of an example embodiment can include modifying domain content and monitoring/managing the operation of each of the new domains in a bulk processing fashion. FIG. 4 illustrates a detail of the processing modules included in the bulk domain management module 230 of an example embodiment.

Referring to FIG. 4, the bulk domain management module 230 of an example embodiment includes two basic sets of functional components. A bulk domain editor 231 can assist a user in modifying the content of previously developed domains. The bulk domain editor 231 of an example embodiment can enable a user to select an item in a particular page and/or a particular site that the user wants to change (e.g., add/delete/modify a page, add/delete/modify an image, text block, or other content item, change a color scheme, change a zone, edit keywords, etc.). Then, the user can select all the domains to which the edit should apply. Automatically, all the specified changes are replicated across the selected domains in bulk fashion.

A set of domain management tools 232 provide various functional components with which a user can monitor and manage the operation of each of the new domains acquired by the domain generation module 220. A particular embodiment provides several tools for managing and gathering information from a set of domains. For example, these tools can include DNS validation, site map generation, search engine pinging, analytics upload, and the like. It will be apparent to those of ordinary skill in the art that a variety of domain management tools can be provided as part of the domain management tools 232 of a particular embodiment.

Referring again to FIG. 2, an analytics module 240 of an example embodiment can include functional components for capturing and recording data items and system parameters that may be of use to host site 110 administrators and/or $3^{rd}$ party sites 170 (see FIG. 1). The analytics recorded by the analytics module 240 can include a variety of data, such as the number of users, numbers of domains acquired by users, categories of content most used by users, anonymized user profiles and demographics, site mappings, domain click through metrics, original content portal traffic, and the like. The analytics data can be stored in the analytics data area 109 of database 102. This analytics data can be of use to host site 110 administrators for optimizing the operation of host site 110 and for correcting error conditions. This analytics data can be of use to 3$^{rd}$ parties for marketing and/or advertising activities. 3$^{rd}$ parties can access the analytics data 109 in database 102 with approval of host site 110 via network 120 using application programming interfaces (APIs) provided by the host site 110.

Figure 7:
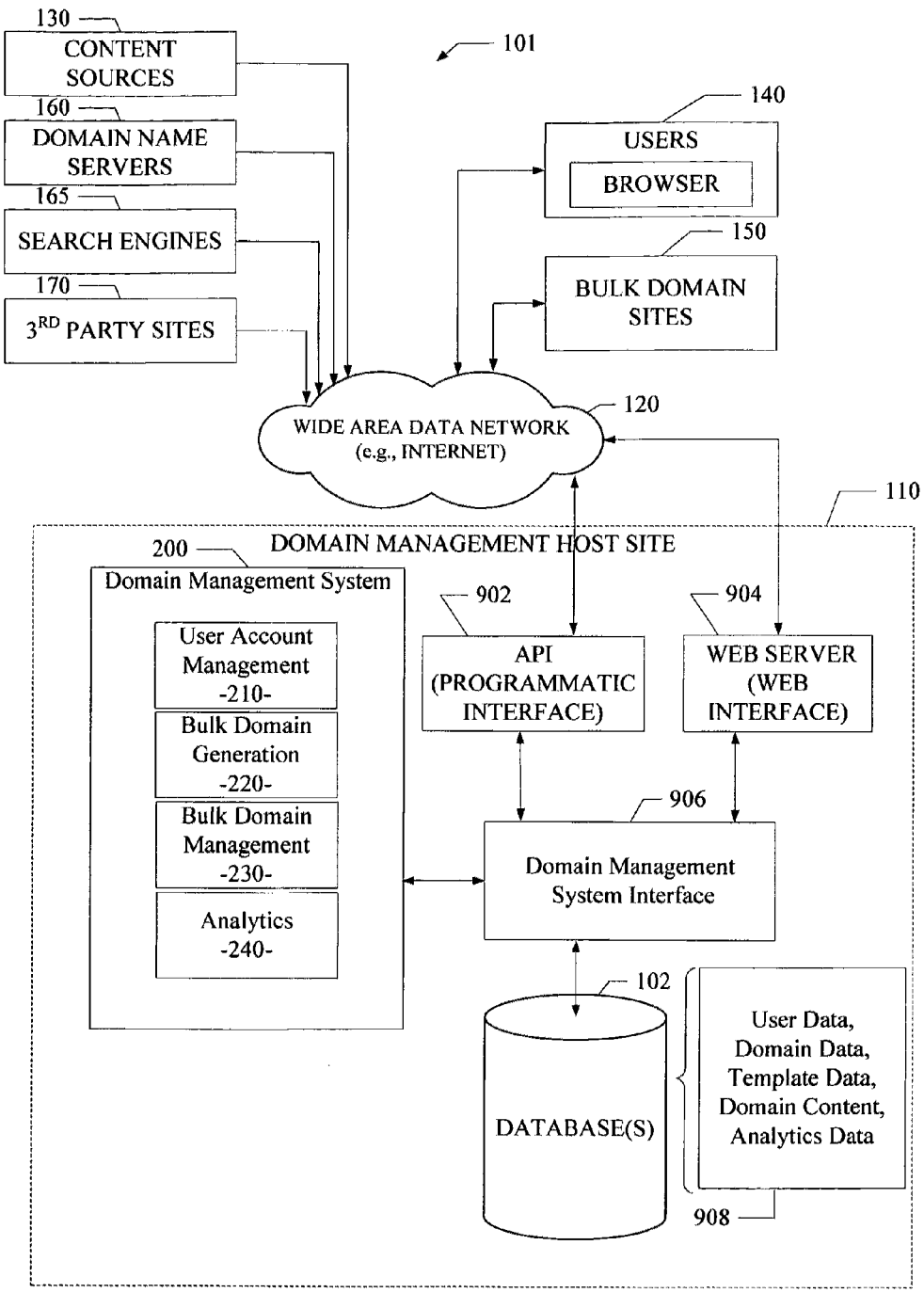
FIG. 7 illustrates another example embodiment of a networked system in which various embodiments may operate.

Referring now to FIG. 7, another example embodiment 101 of a networked system in which various embodiments may operate is illustrated. In the embodiment illustrated, the host site 110 is shown to include the domain management system 200. The domain management system 200 is shown to include the functional components 210-240, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the domain management system 200 either directly or via an interface 906. The domain management system 200 may be configured to access a data storage device 102 either directly or via the interface 906.

Figure 37:
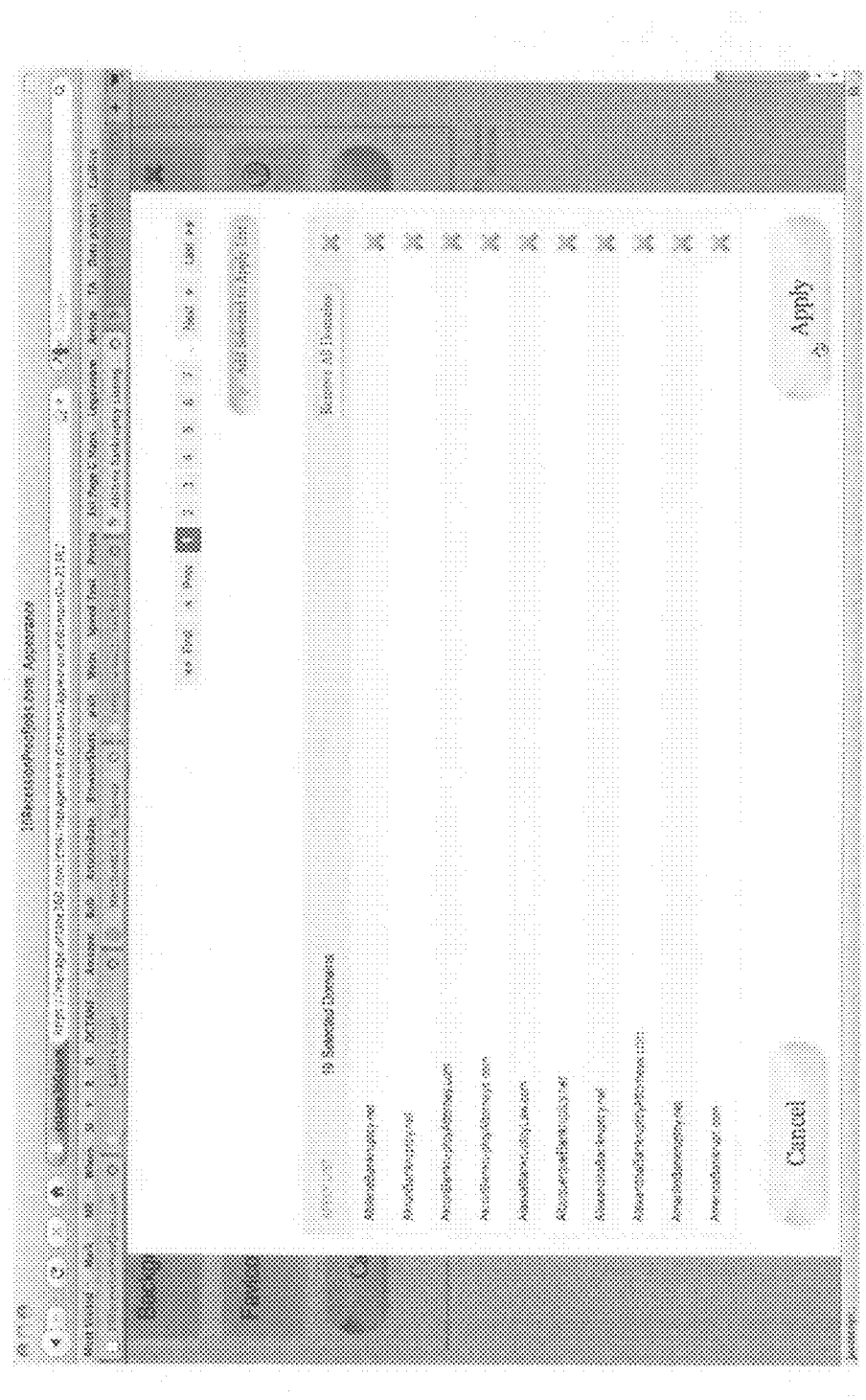
Figure 38:
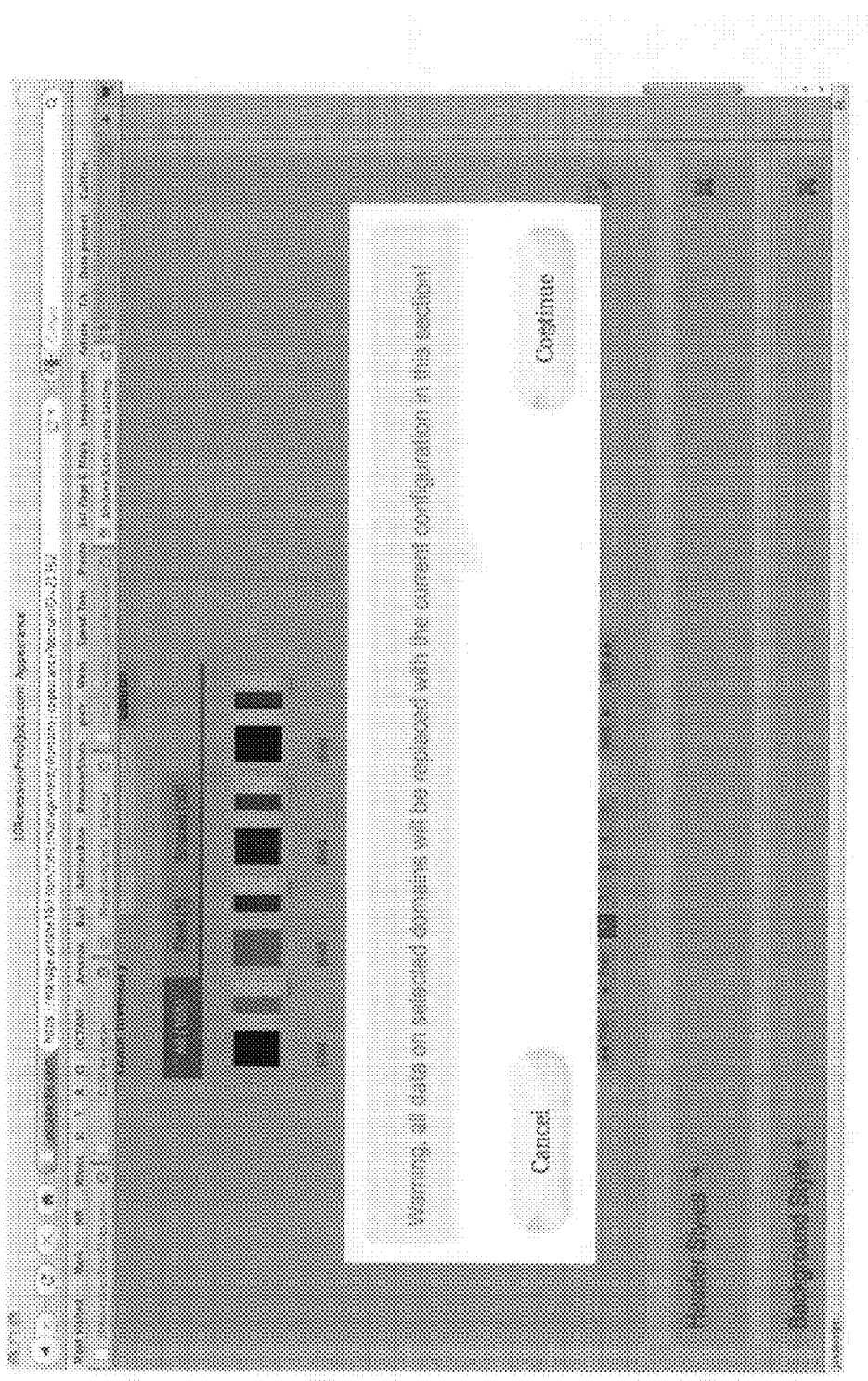
Figure 39:
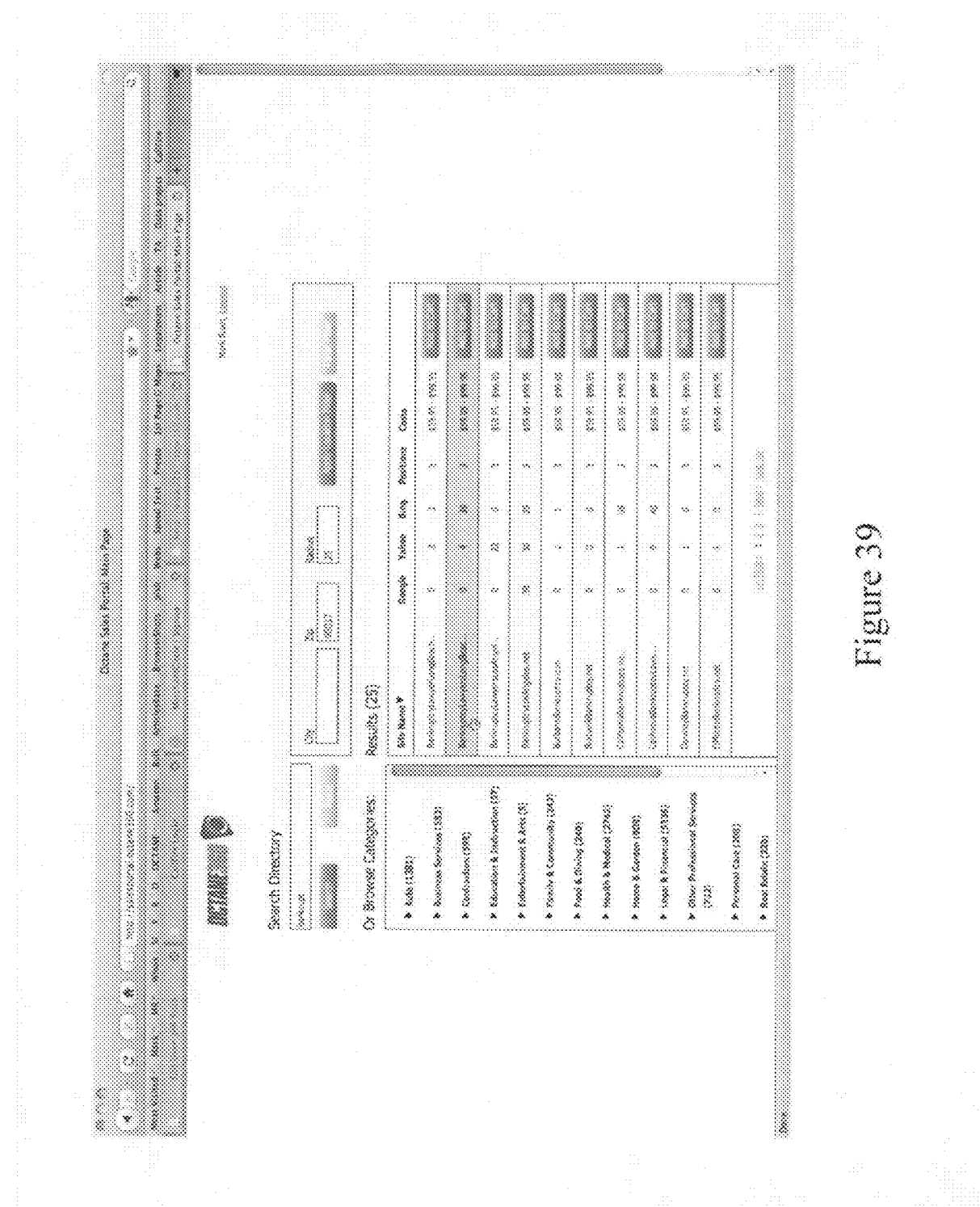
FIGS. 39-40 illustrate examples of the advertising sales portal functionality of an example embodiment
Figure 40:
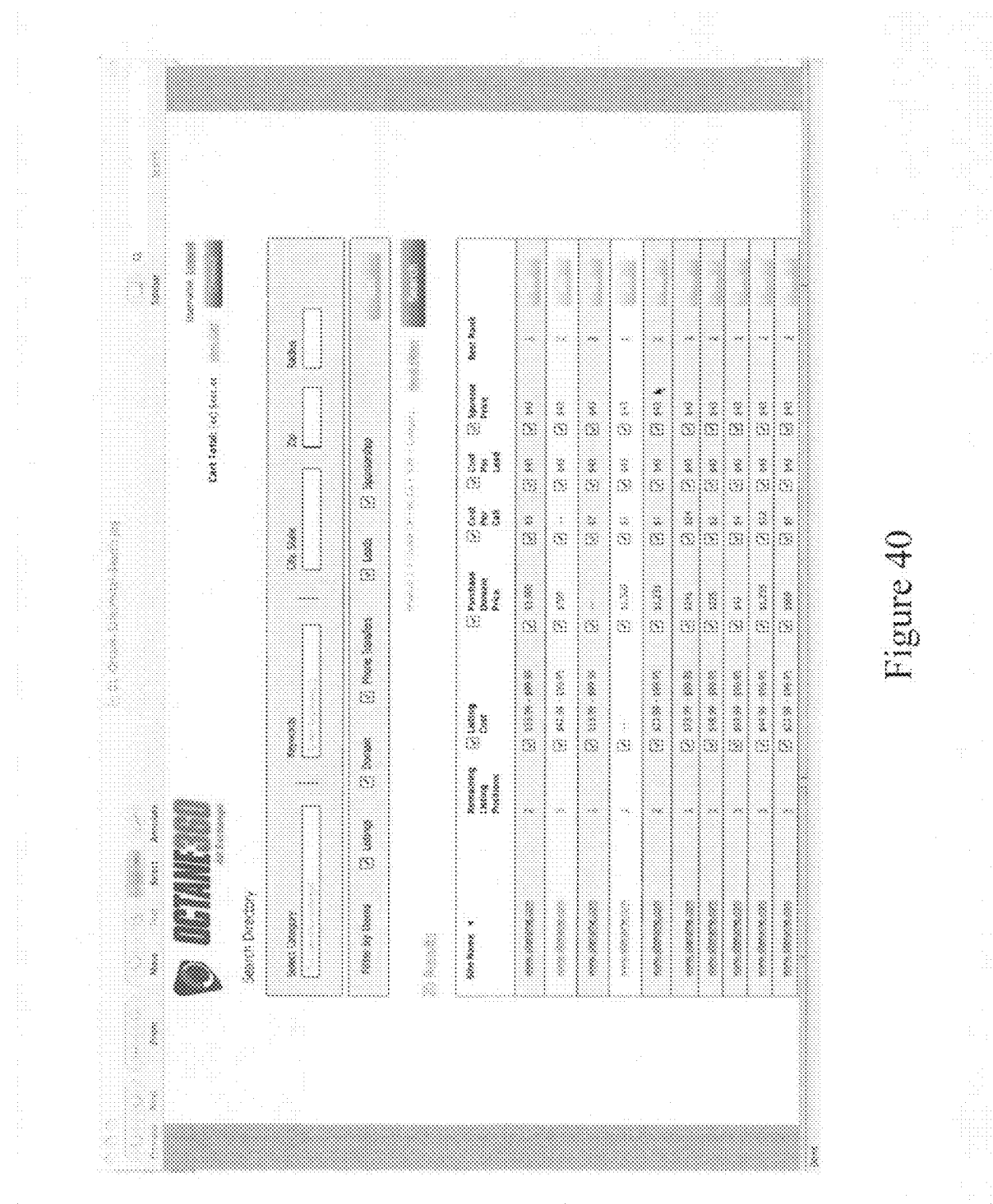

Referring now to FIGS. 8-40, sample screen snapshots illustrate the operation of an example embodiment. In particular, FIGS. 8-14 illustrate examples of the bulk domain purchase functionality of an example embodiment. FIGS. 15-26 illustrate examples of the global variables functionality of an example embodiment. FIGS. 27-38 illustrate examples of the mass domain management functionality of an example embodiment. FIGS. 39-40 illustrate examples of the advertising sales portal functionality of an example embodiment.

Figure 8:
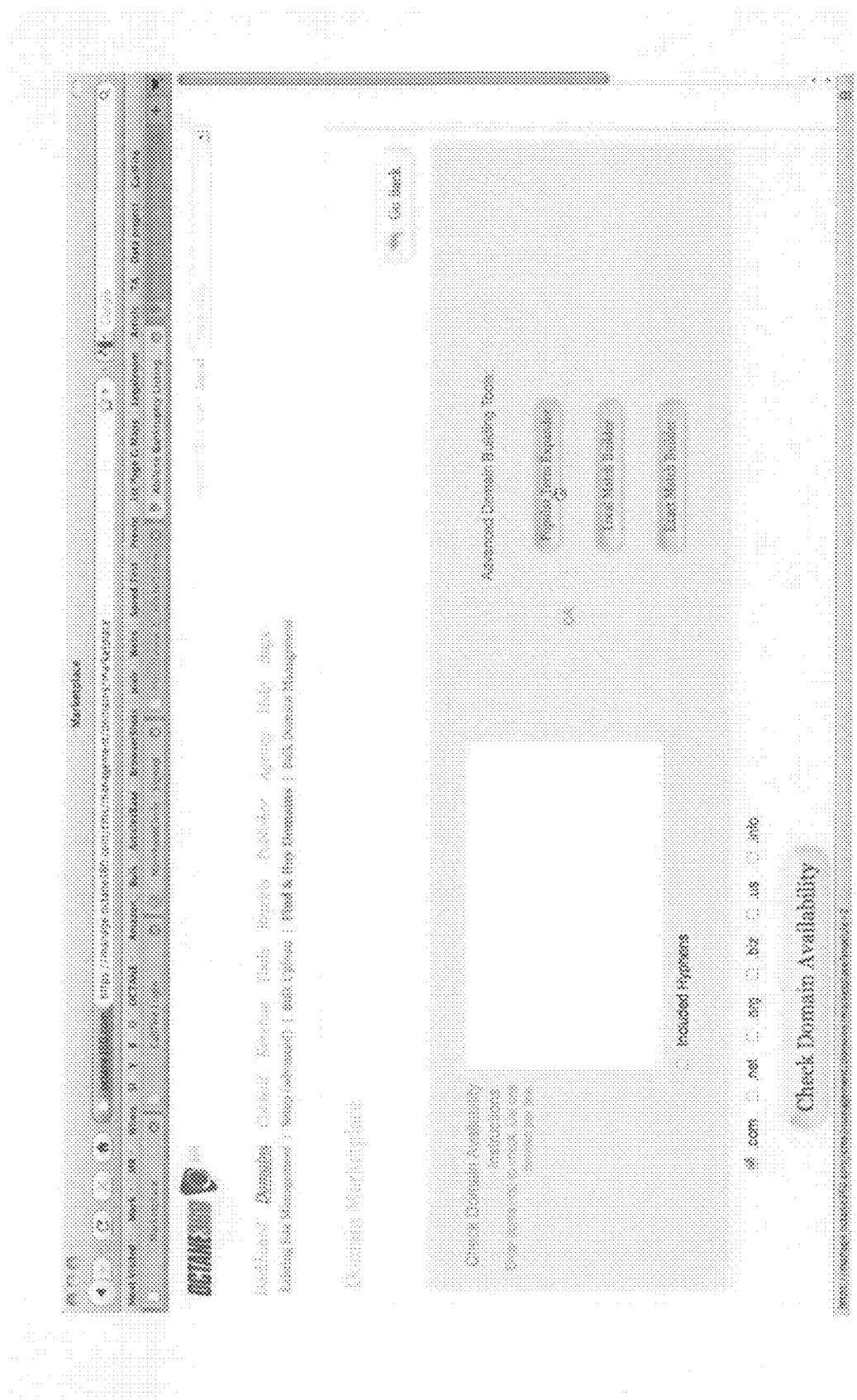
FIGS. 8-14 illustrate examples of the bulk domain purchase functionality of an example embodiment.
Figure 9:
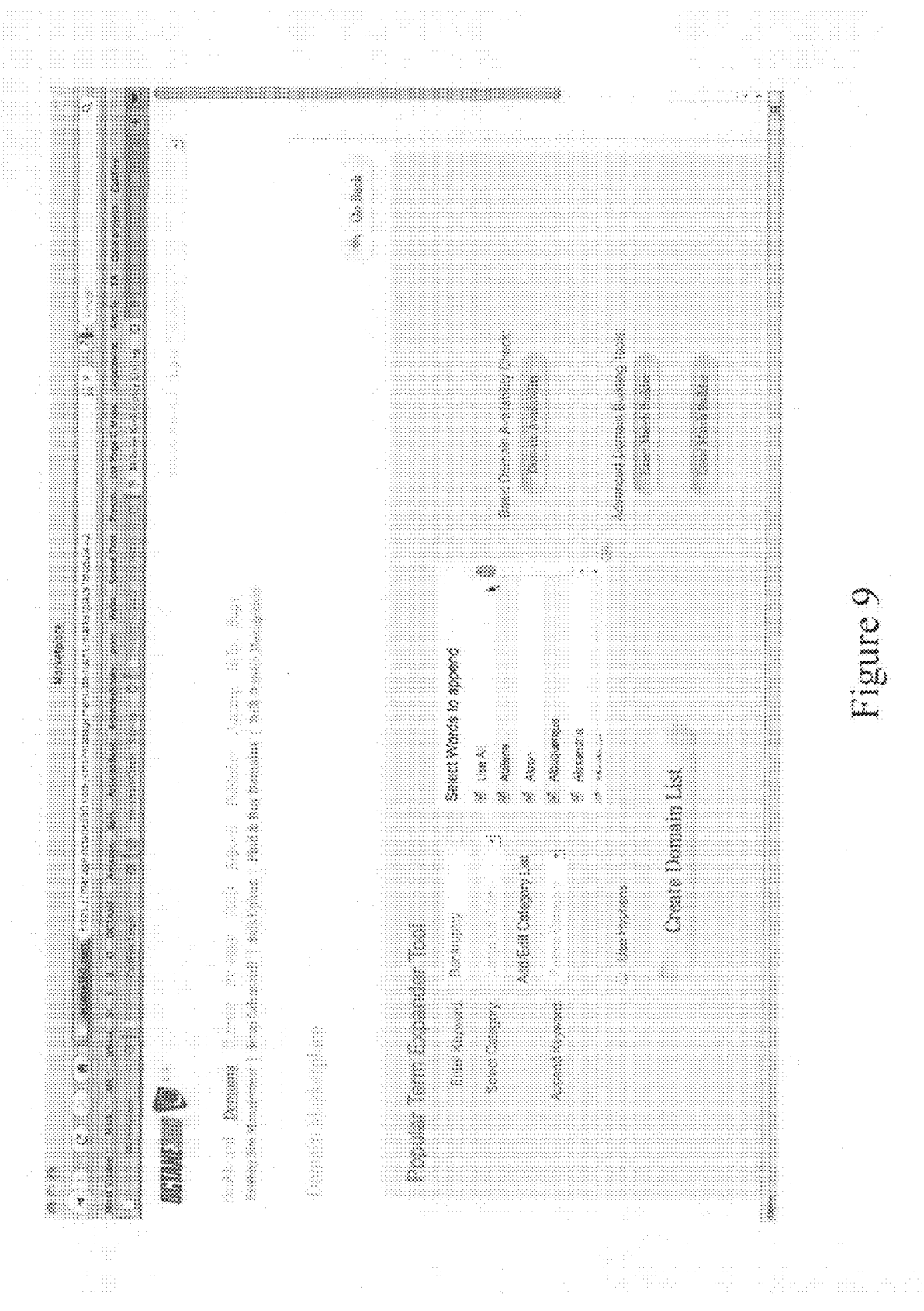
Figure 10:
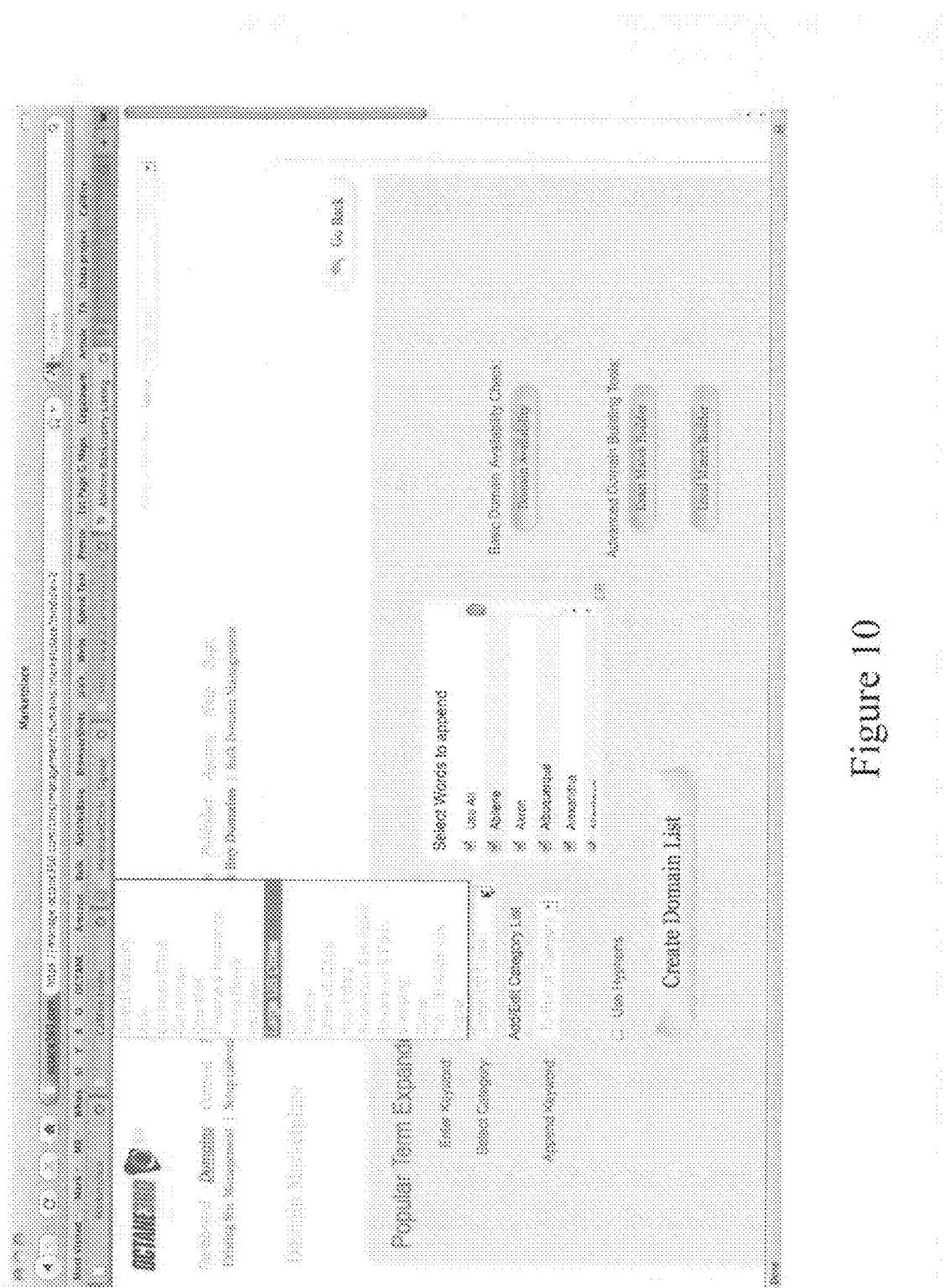
Figure 11:
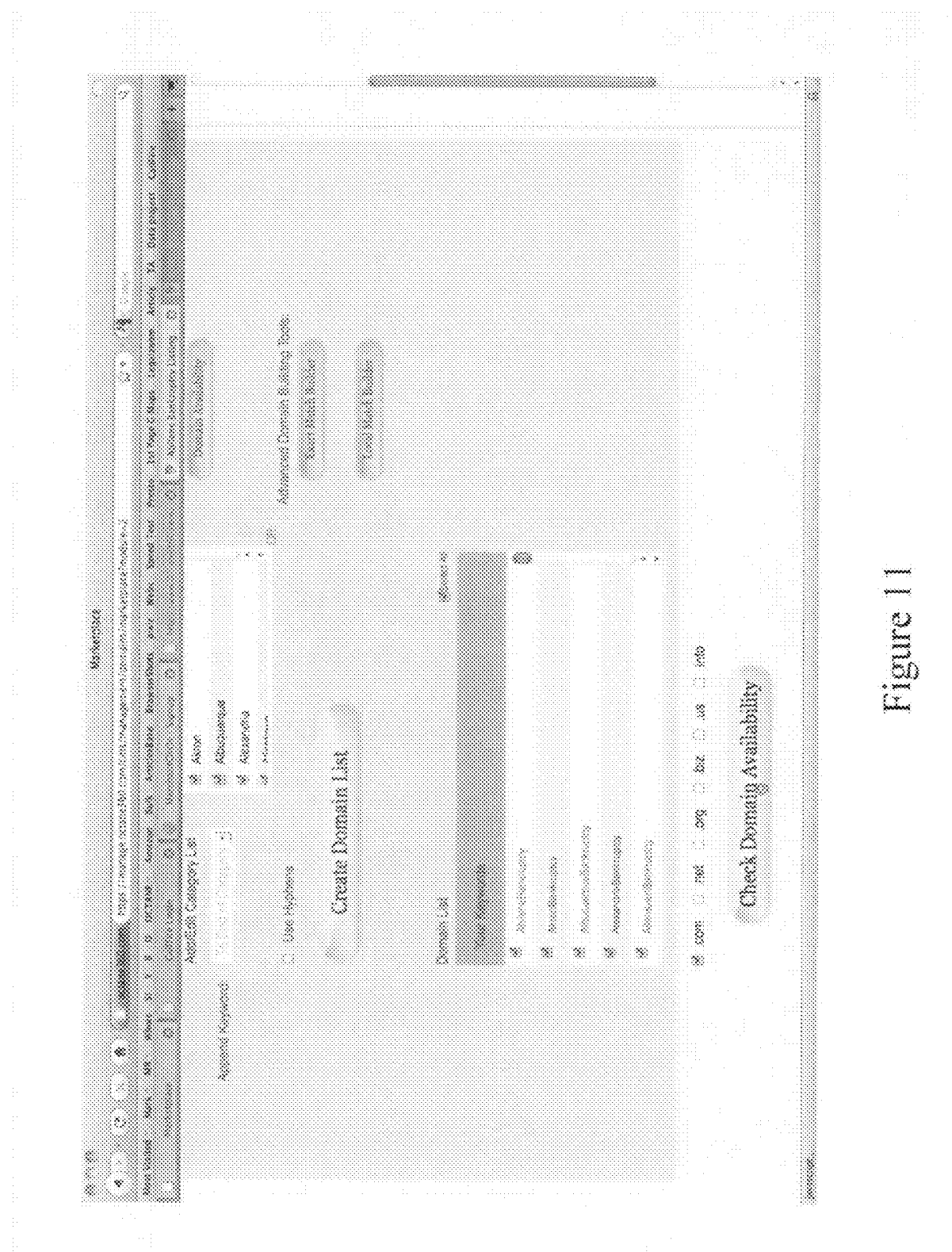

Referring now to FIGS. 8-14 examples of the bulk domain purchase functionality of an example embodiment are illustrated. As shown in FIG. 8, a user can insert the name of a desired domain name into a text entry block provided as part of the sample user interface web page shown in FIG. 8. The bulk domain generation module 220 can check the availability of the entered domain names using conventional functionality. Additionally, the user can employ several other tools to assist in the generation and development of a set of desired domain names. For example, a 'Popular Term Expander' tool is provided as shown in FIG. 8. Upon activation of this tool, a web page, such as the example shown in FIG. 9, is displayed. Using this tool, the user can enter a keyword (e.g., 'bankruptcy') and one of a variety of category selections, such as the category selections shown in FIG. 10. In the example of FIG. 10, a category selection, 'Large US cities' is selected. As a result, a corresponding set of words to append (append words) are presented as shown in FIGS. 9-10. The append words are words or phrases that relate to the selected category. The user can also choose the particular append words that can be included in the expanded domain names. Once the user selects 'Create Domain List', the bulk domain generation module 220 combines the entered keyword(s) with each of the append words to create a list of expanded domain names (domain list), which is presented to the user in a web page, such as the example shown in FIG. 11. The user can also enter additional appended keywords, select the order in which the terms are concatenated, and insert special characters in the expanded domain names. In this manner, the user can automatically populate a domain list with candidate domain names that are relevant to the user. Additionally, depending on the category selection picked by the user as described above, the bulk domain generation module 220 can present additional information related to each of the append words corresponding to the selected category. For example, if the selected category is 'Large US Cities' and the corresponding append words are the names of large US cities, the bulk domain generation module 220 can present additional information related to each of the named large US cities, such as population, location, economic information related to the city, business information related to the city, etc. In this way, the user can easily view background information on a particular append word prior to selecting the append word as part of the set of automatically generated domain names. As shown in FIG. 11, once the user selects from among the candidate domain names presented in the domain list, the user can check the availability of these automatically generated domain names using the process described above.

Figure 12:
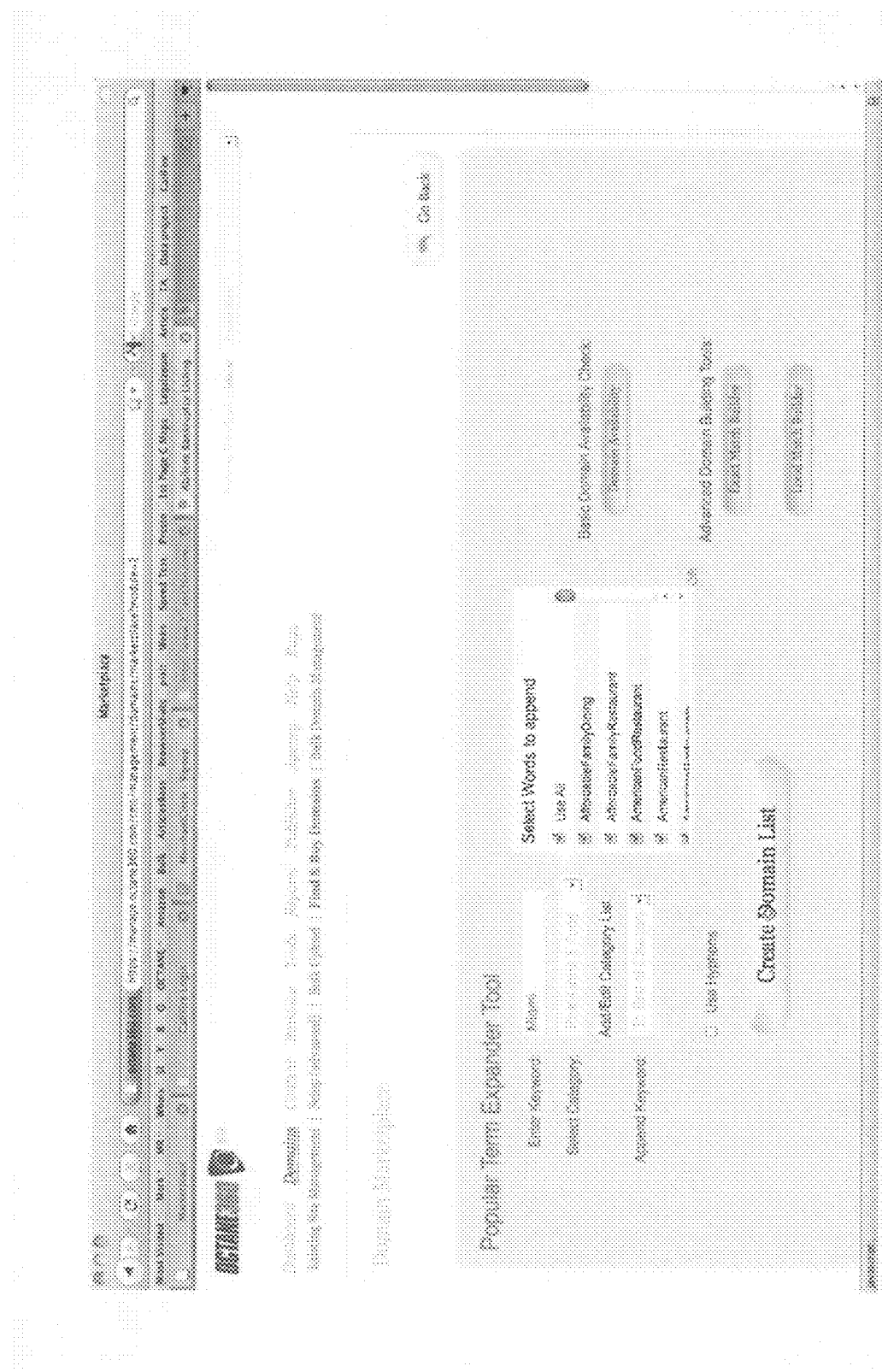
Figure 13:
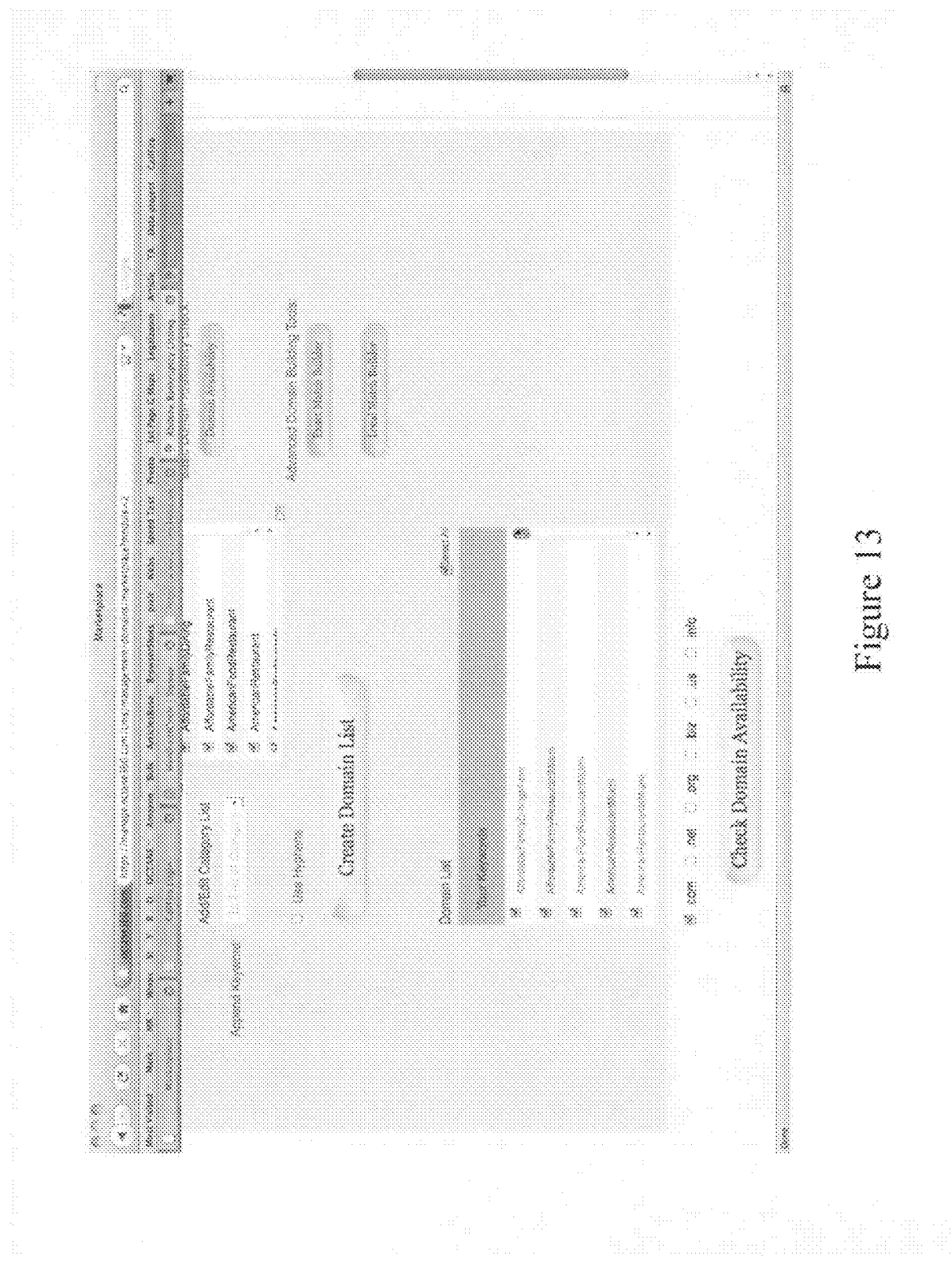

FIGS. 12-13 illustrate a second example of the 'Popular Term Expander' tool of an example embodiment. In the example shown in FIG. 12, the user has entered a keyword 'Miami' and selected the category 'Restaurant & Food'. As a result, the bulk domain generation module 220 has populated the append word list with a set of append words that relate to the selected category 'Restaurant & Food'. Again, the user may individually select any or all of the append words in the append word list. The user can then activate the 'Create Domain List' button as shown in FIG. 12. In response to the activation of the 'Create Domain List' button, the bulk domain generation module 220 populates the domain list shown in FIG. 13. This domain list contains automatically-generated candidate domain names that include the user-entered keyword(s) in combination with the user-selected append words that relate to the user-selected category. The user may individually select any or all of the candidate domain names in the domain list. The user can then activate the 'Check Domain Availability' button as shown in FIG. 12 to check the availability of the selected domain names using the process described above.

Figure 14:
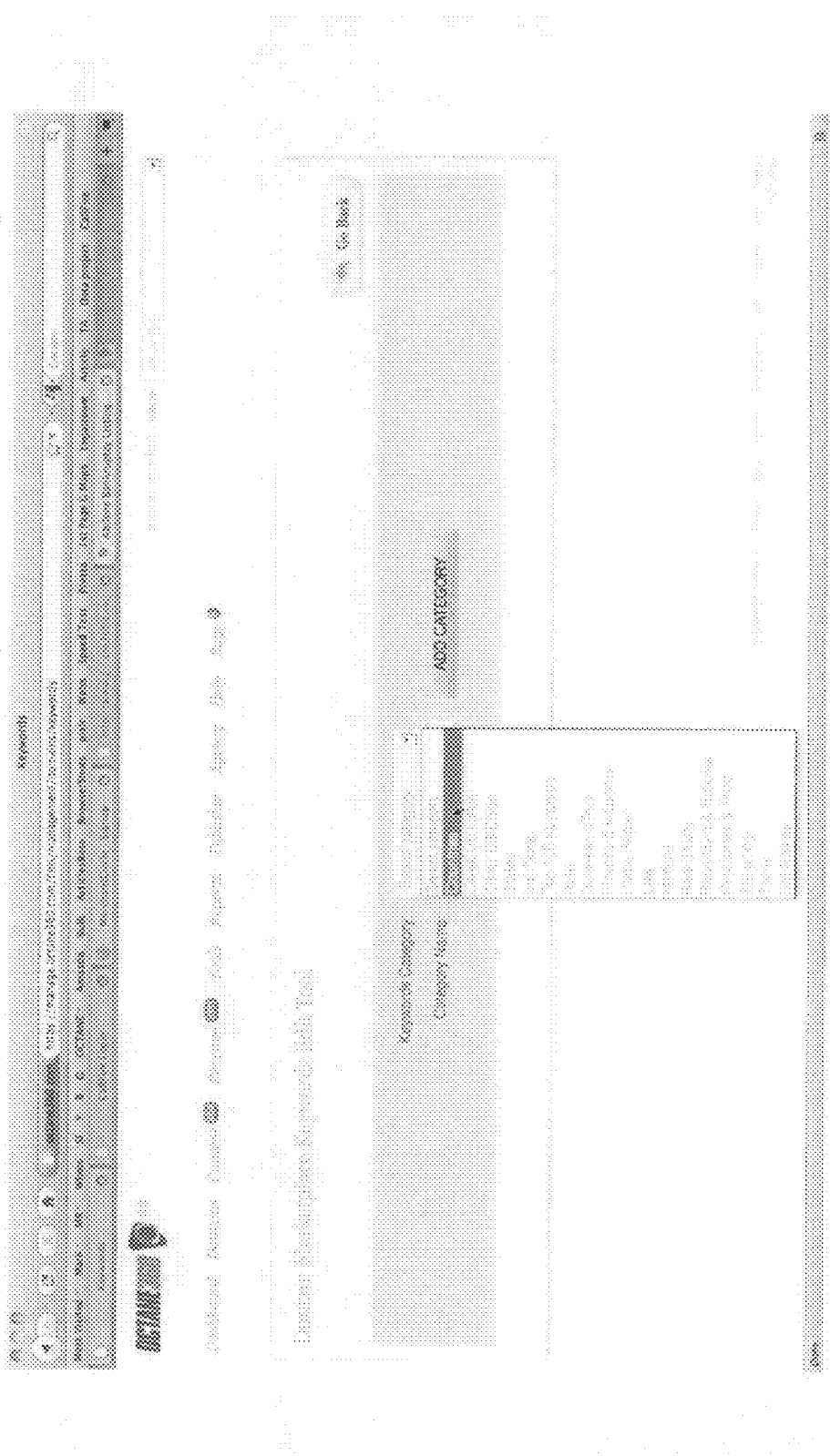

FIG. 14 illustrates the capability of the bulk domain generation module 220 to add additional categories and corresponding append words with which the bulk domain generation module 220 can automatically generate candidate domain names in the manner described above.

Figure 15:
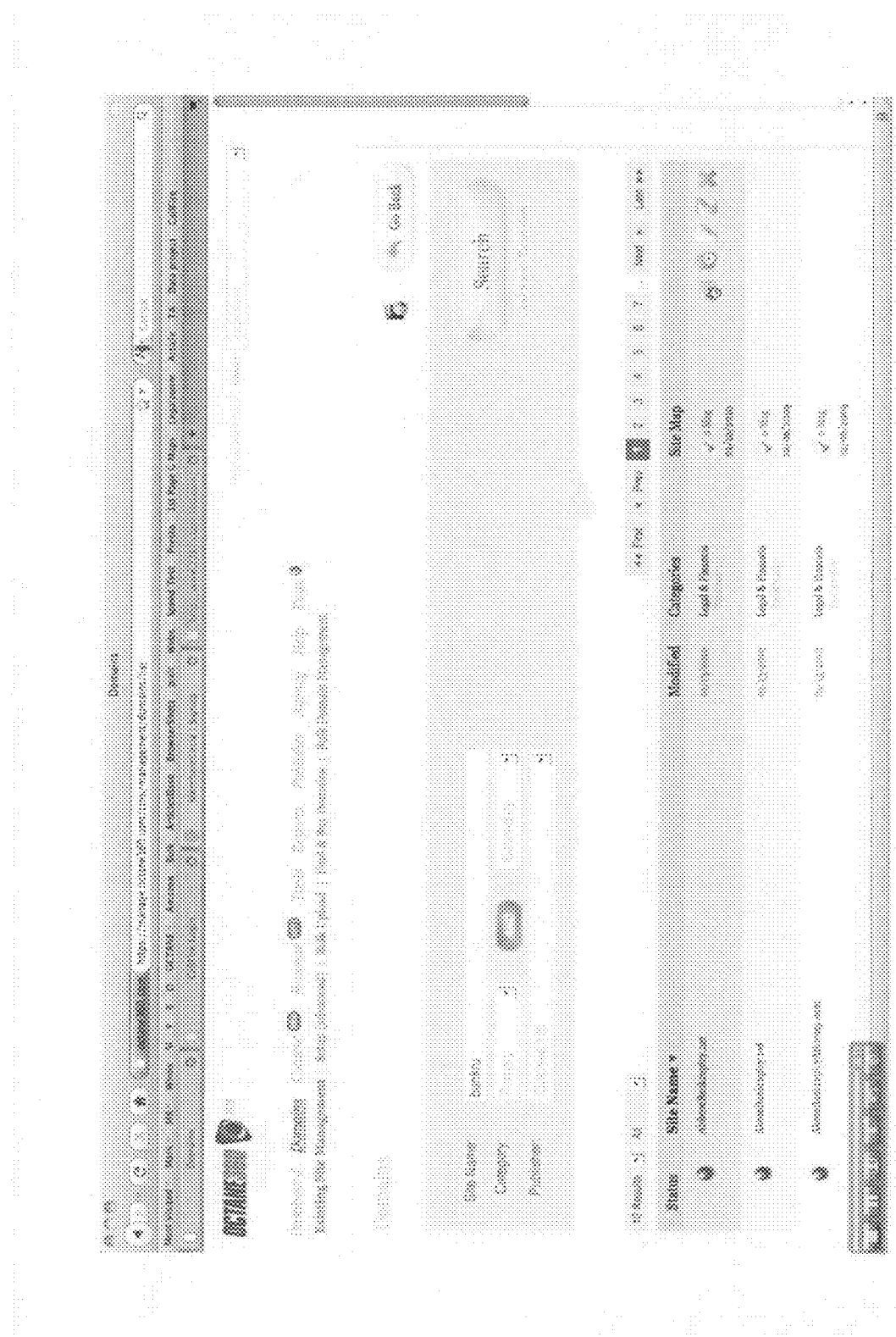
FIGS. 15-26 illustrate examples of the global variables functionality of an example embodiment.
Figure 16:
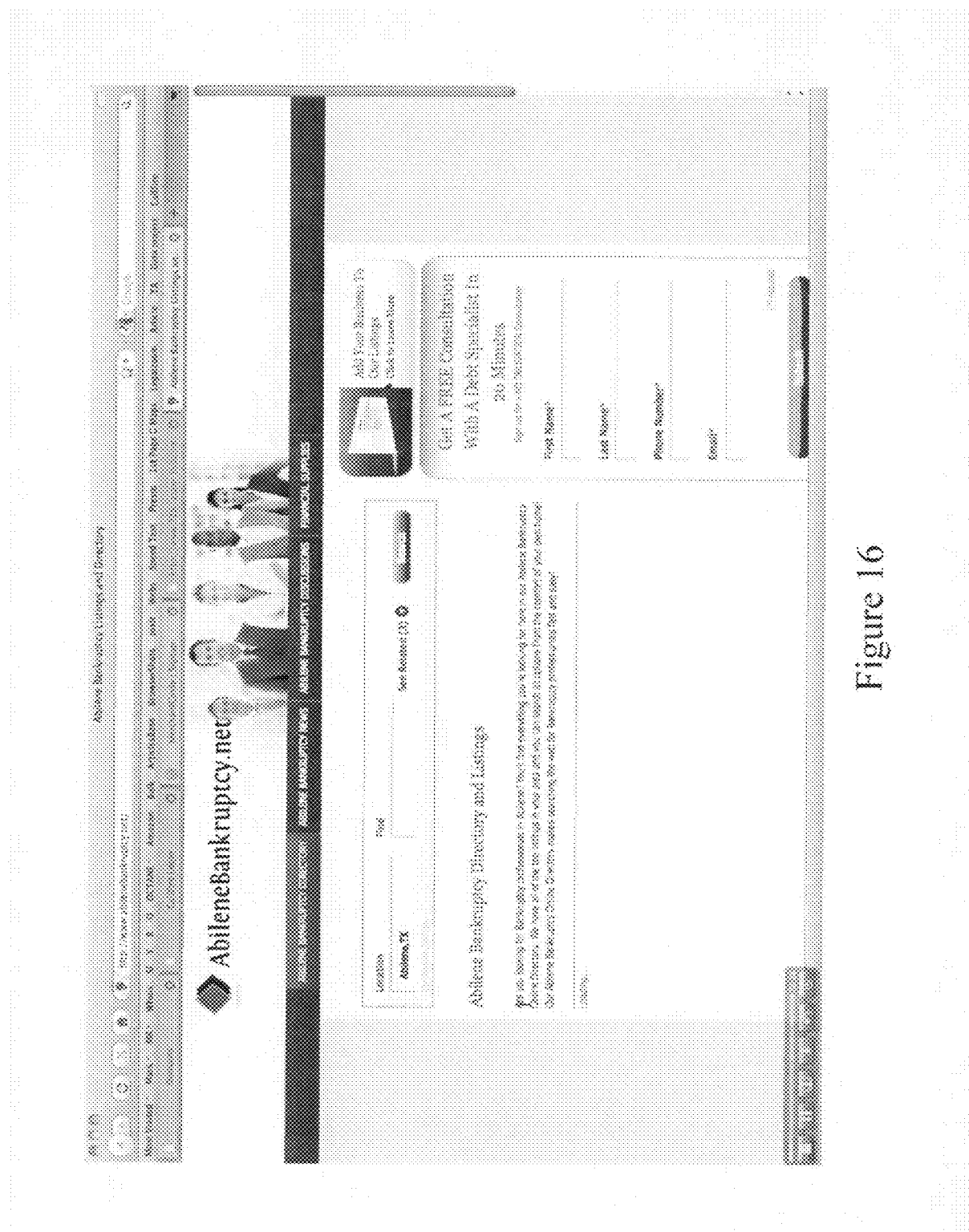
Figure 17:
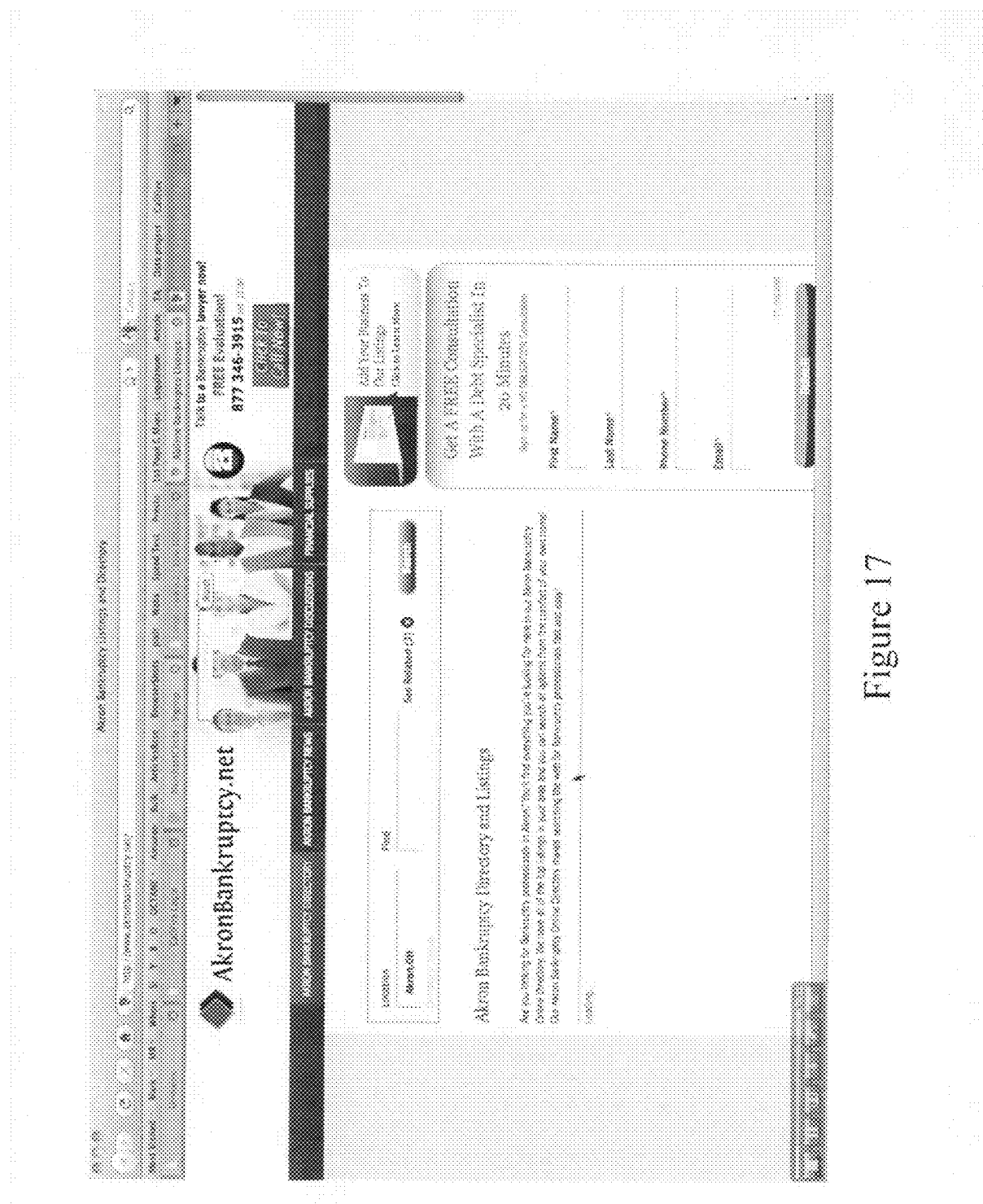

Referring now to FIGS. 15-26, examples illustrate the use of the global variables functionality of an example embodiment. Global variables provide a way for users to specify a type of content item in web page content or meta data that is replaced with actual content when a particular website is built. For example, FIG. 15 shows a sample list of domains that might result from a domain name search query (e.g., 'bankru'). This sample set of domain names might have been created using the 'Popular Term Expander' capability of the bulk domain generation module 220 as described above. Each of the domains in the sample list of domains have associated pages of content and meta data. In most cases, this content and meta data for each domain can be automatically and uniquely created using the various techniques described herein. For example, a content page of the first domain (e.g., 'AbileneBankruptcy.net') in the sample list of domains is shown in FIG. 16. Similarly, a content page of the second domain (e.g., 'AkronBankruptcy.net') in the sample list of domains is shown in FIG. 17. By comparing these two different content pages of two different domains, it can be seen that, though the pages are similar in structure and content, the page content is nevertheless unique to each particular domain. This uniqueness can be achieved using global variables as described herein.

Figure 18:
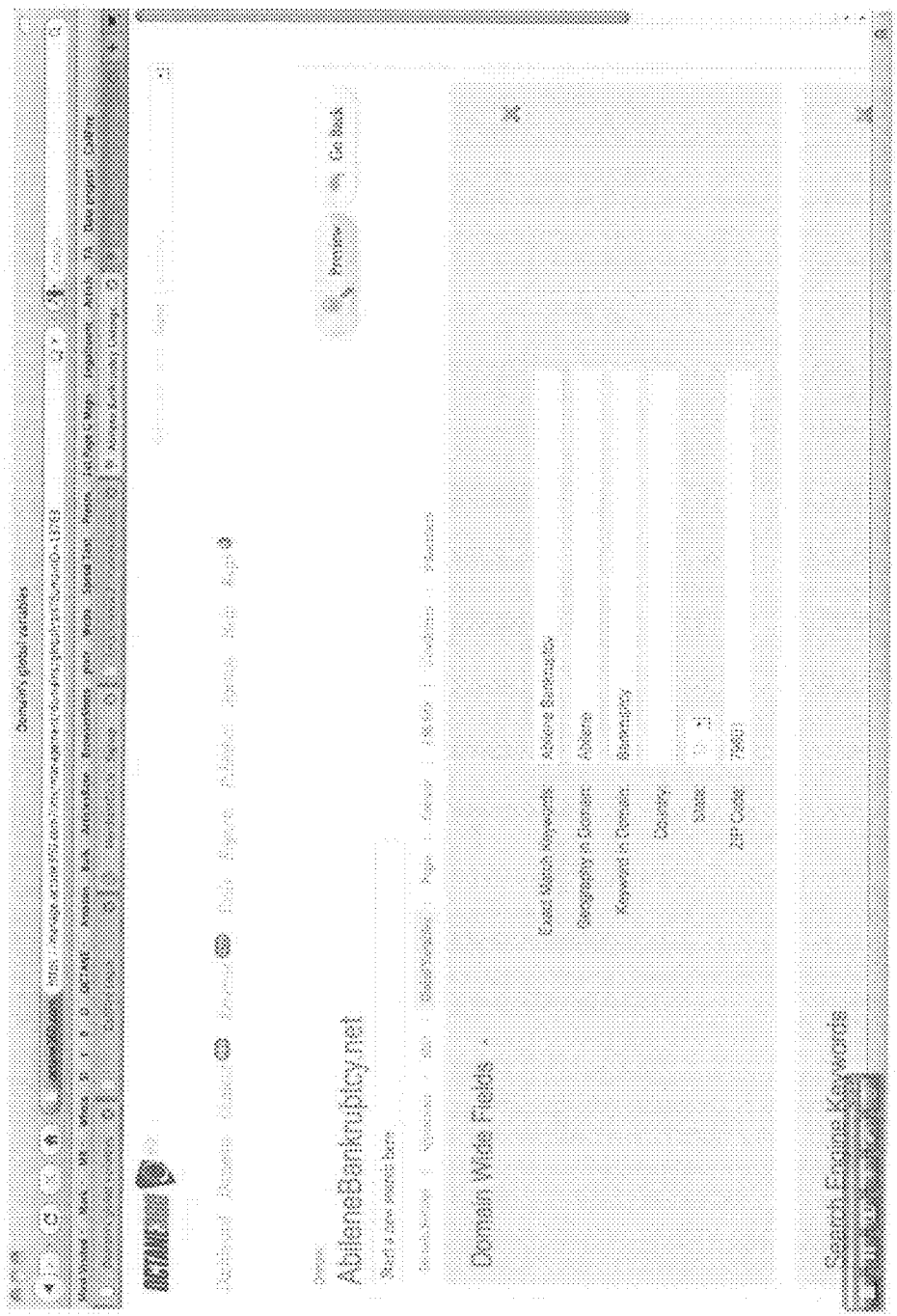

Referring now to FIG. 18, a sample screen snapshot of a user interface provided by the bulk domain generation module 220 is illustrated. The sample user interface shown in FIG. 18 provides a set of data entry fields wherein a user can configure a set of keywords and geographical information associated with a particular domain of the set of domains. These configured keywords and the domain-specific geographical information can be substituted for global variables, which are inserted into a global content template. In this way, a global content template with global variables can be used to create unique content for each domain of the set of domains.

Figure 19:
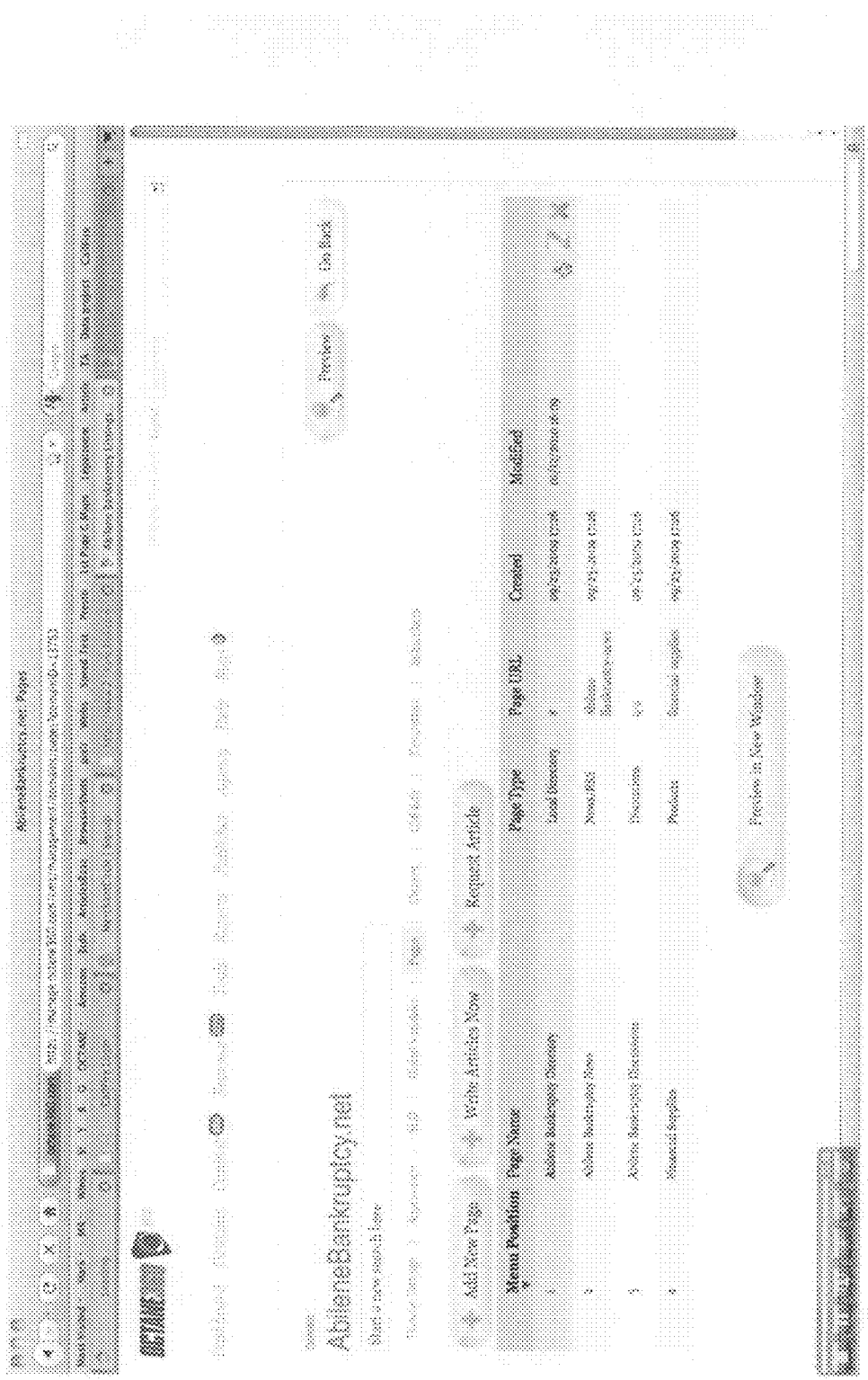
Figure 20:
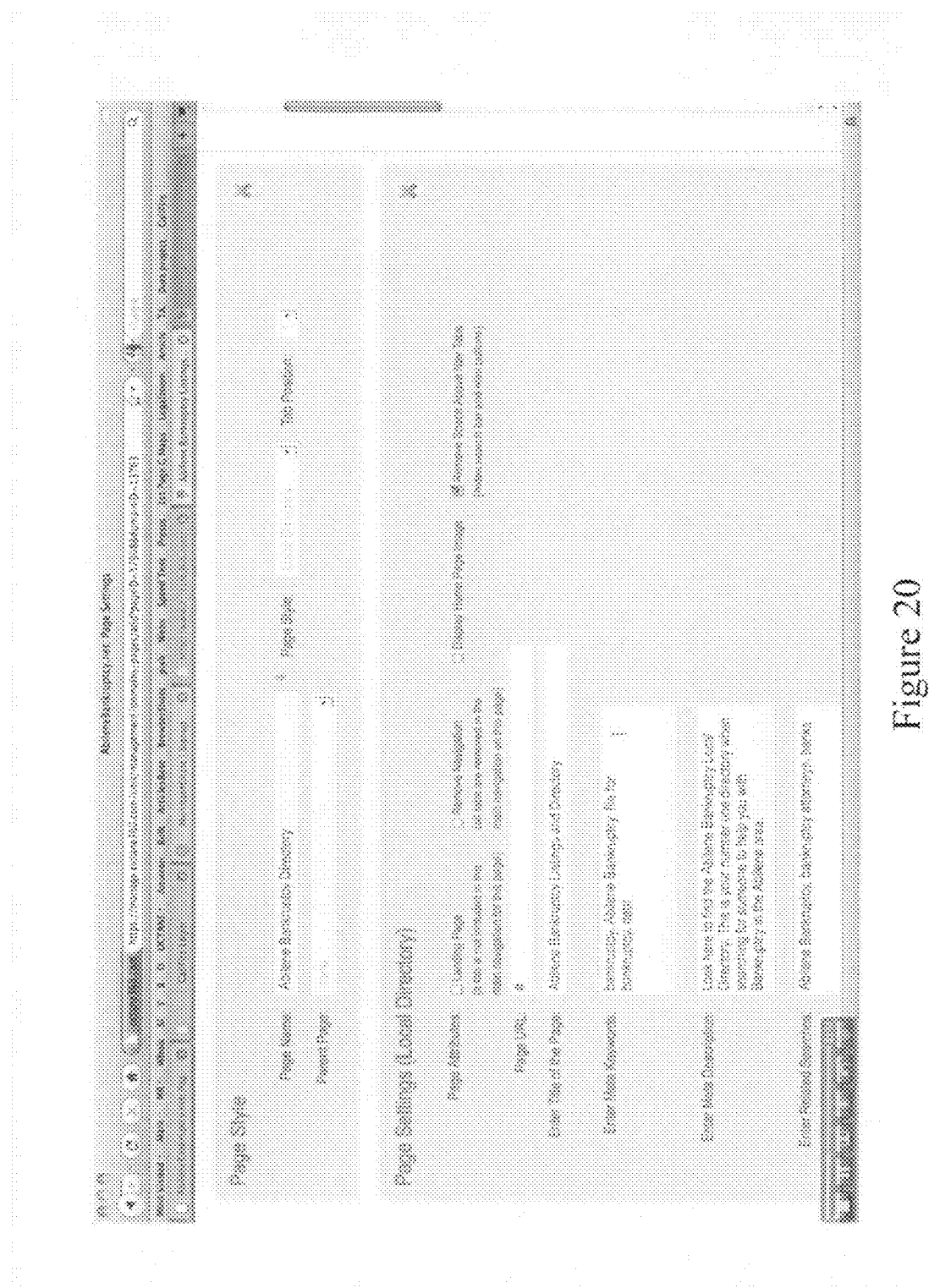
Figure 21:
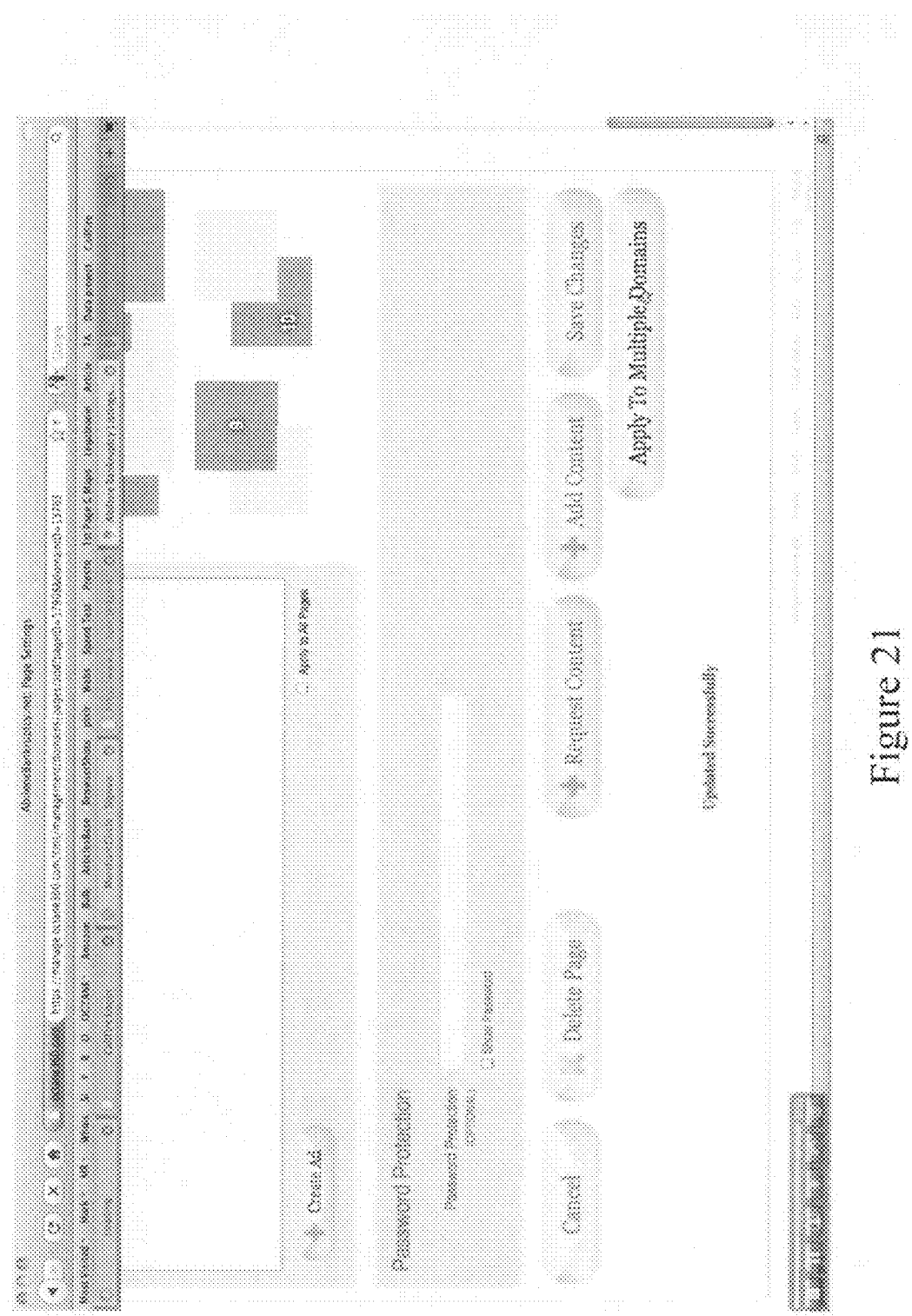
Figure 22:
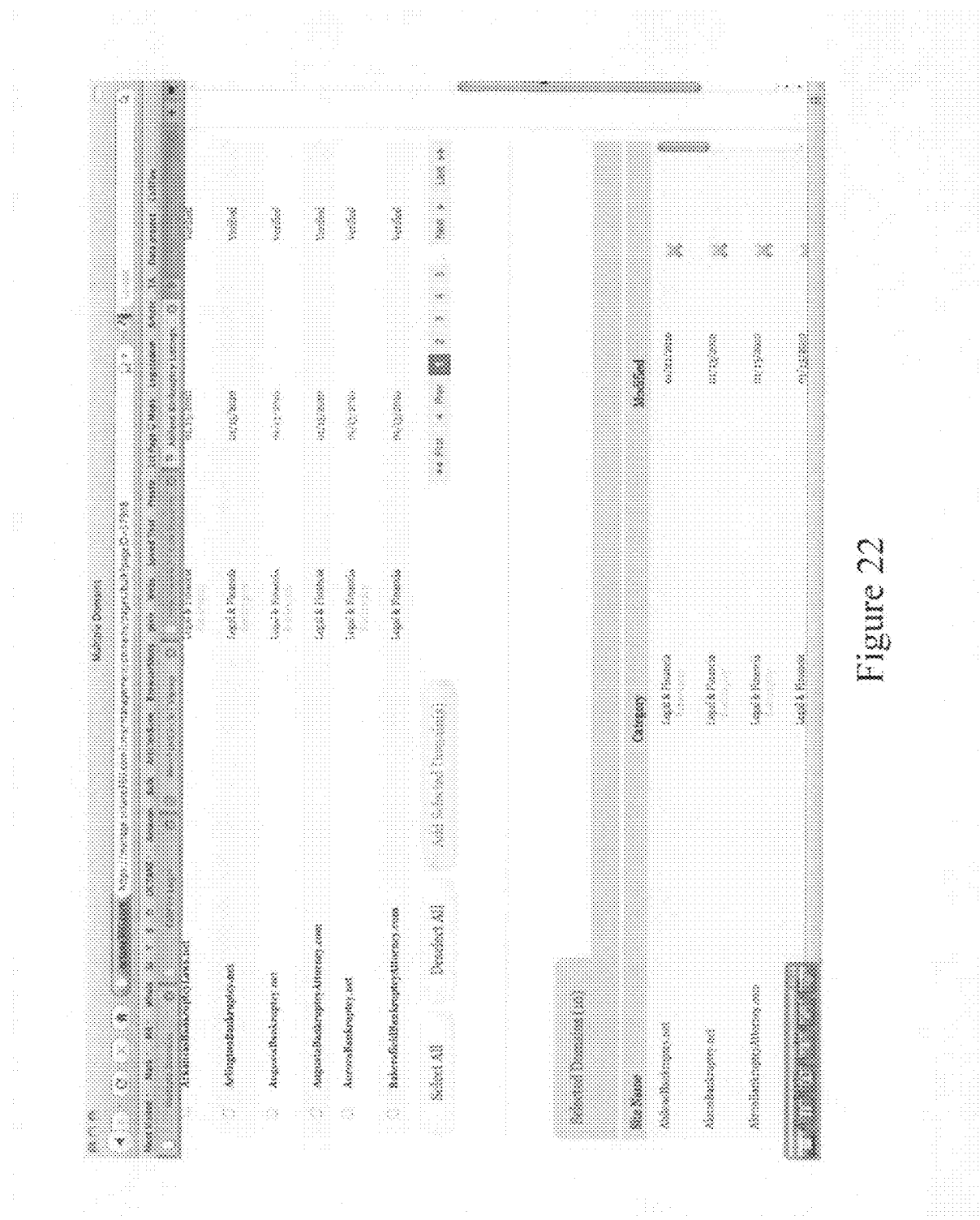
Figure 23:
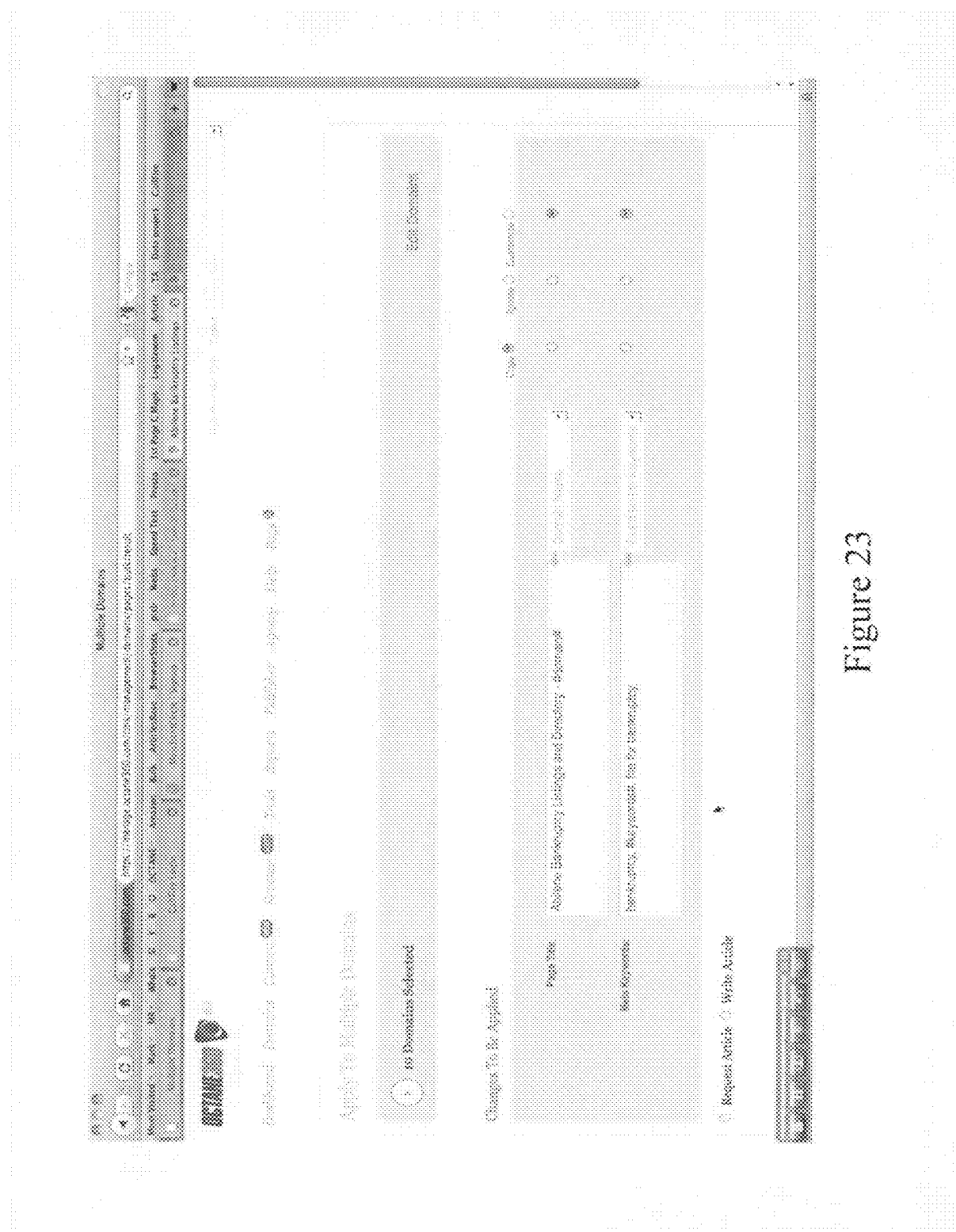
Figure 24:
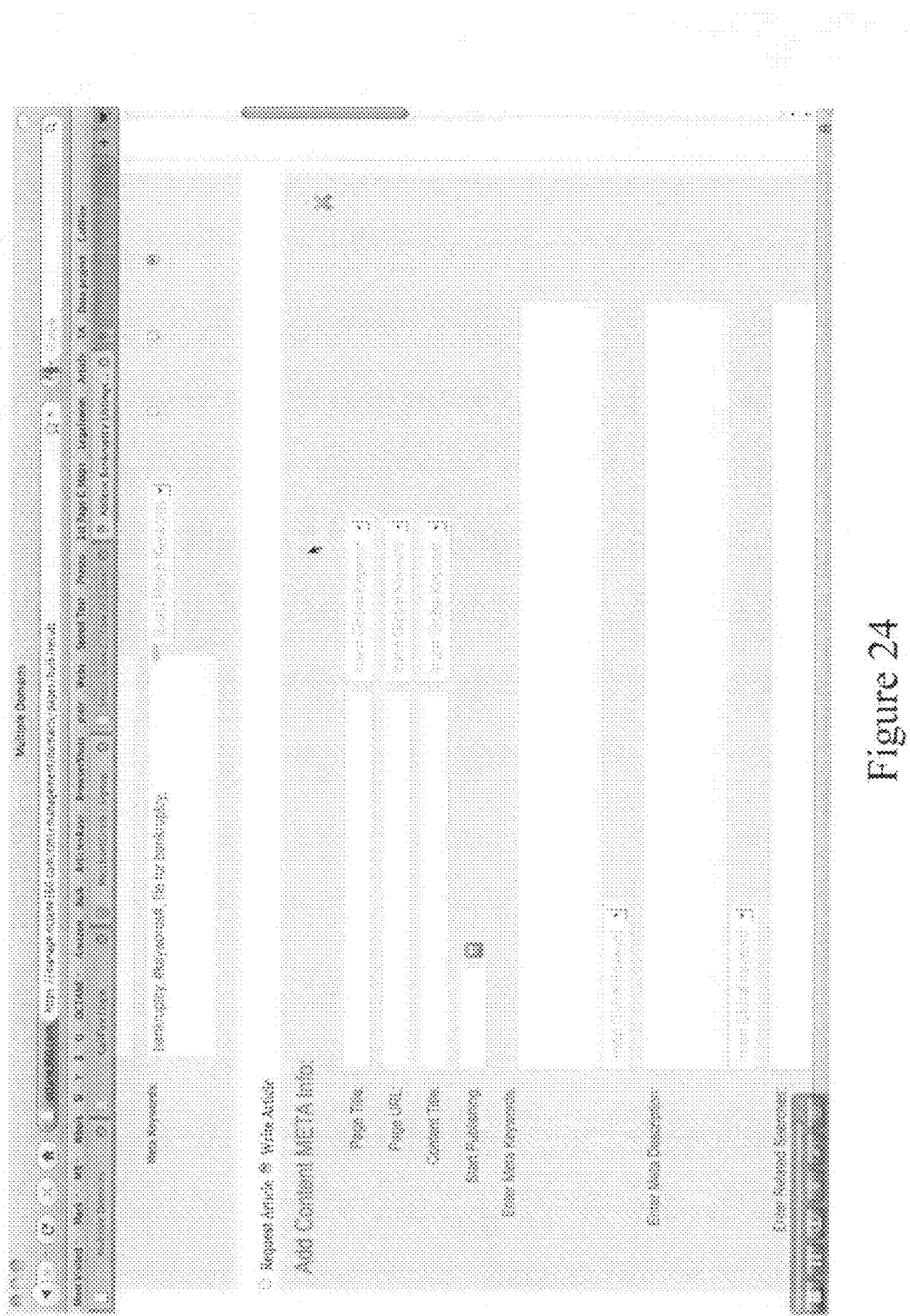
Figure 25:
Figure 26:
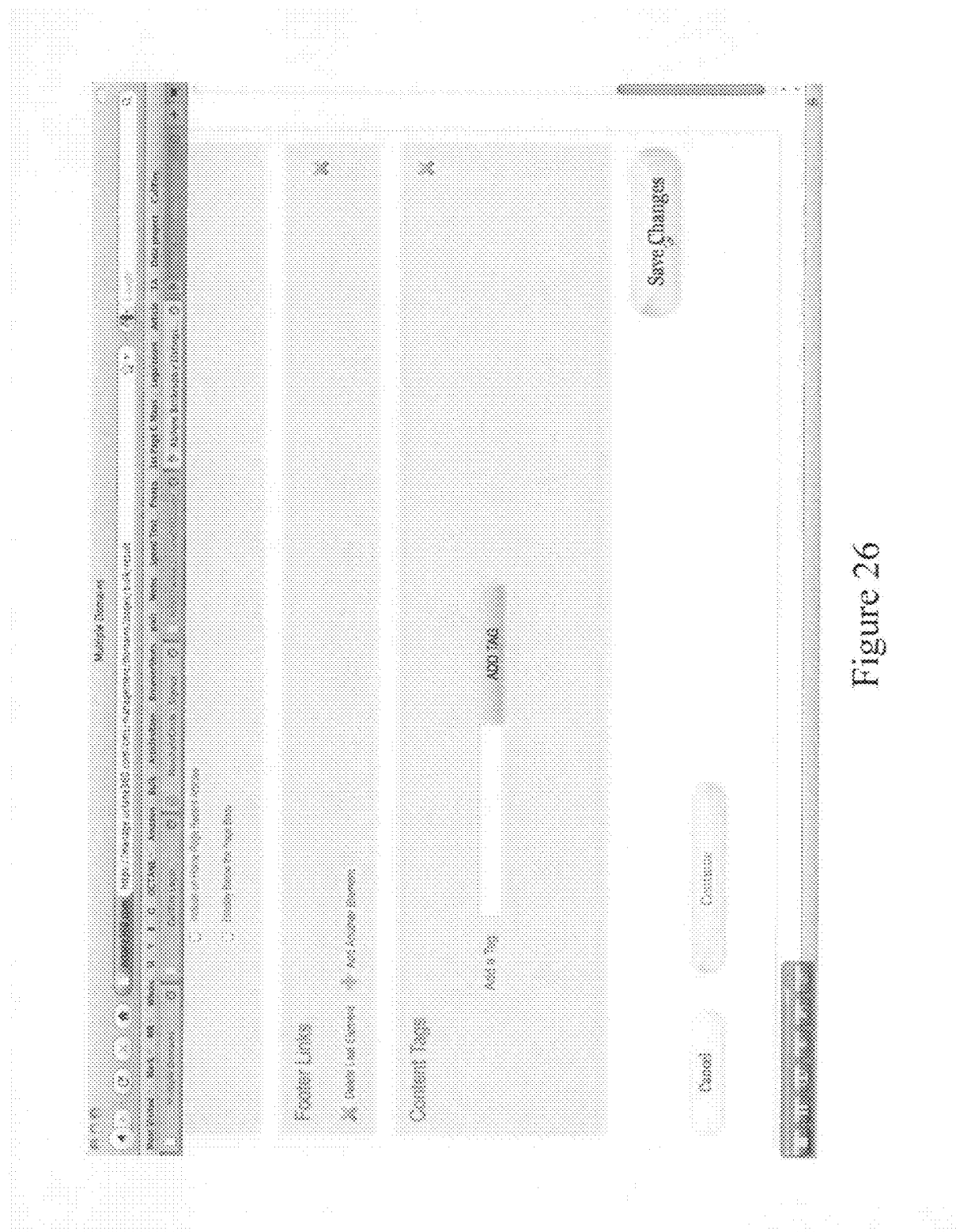

Referring now to FIG. 19, the sample list of domains is again shown with the first domain (e.g., 'AbileneBankniptcy.net') in the sample list of domains having been selected by the user. The user may then select a 'Pages' function to view the content pages of the selected domain. As a result of selecting to view the content pages of this sample domain, the user is presented with the sample user interface screen as shown in FIG. 20. The user interface screen shown in FIG. 20 enables the user to configure the content and meta data of each of the pages of a particular domain. For example, the user can configure various parameters of the page style or page settings as shown in FIG. 20. Once the user has configured the pages for a domain as desired, the user can apply the changes to multiple domains by selecting the 'Apply To Multiple Domains' button as shown in FIG. 21. As a result of selecting the 'Apply To Multiple Domains' button, the user may then perform a domain search or otherwise select the set of domains to which content changes will be applied. An example of the list of selected domains is shown in FIG. 22. Once the user selects the set of domains to which content changes will be applied, the user can specify the particular changes to be applied to the selected multiple domains. As shown in the example of FIG. 23, the user can insert global variables into content data entry fields provided in the user interface shown in FIG. 23. In the example shown, the global variables are identified using a prefixed and suffixed special symbol (e.g., '#'). In the example shown in FIG. 23, the global variables #domain# and #keywords# are shown inserted into the content fields for the content changes to be applied to multiple domains. These global variables, among others defined by the user as described above, can be inserted into any of the content fields or meta data fields associated with the selected multiple domains. As shown in FIGS. 23-26, a variety of content fields or meta data fields in a global content template can be provided for the user to define content or meta data for a variety of pages in each of the selected multiple domains. Once the user selects the 'Save Changes' button shown in FIG. 26, the global variables specified by the user and inserted into the global content template are substituted for domain-specific content and meta data for each of the selected multiple domains. Then, the domain-specific content is applied to each of the selected multiple domains. In this manner, the unique domain content for multiple domains can be generated in mass using global variables.

Figure 27:
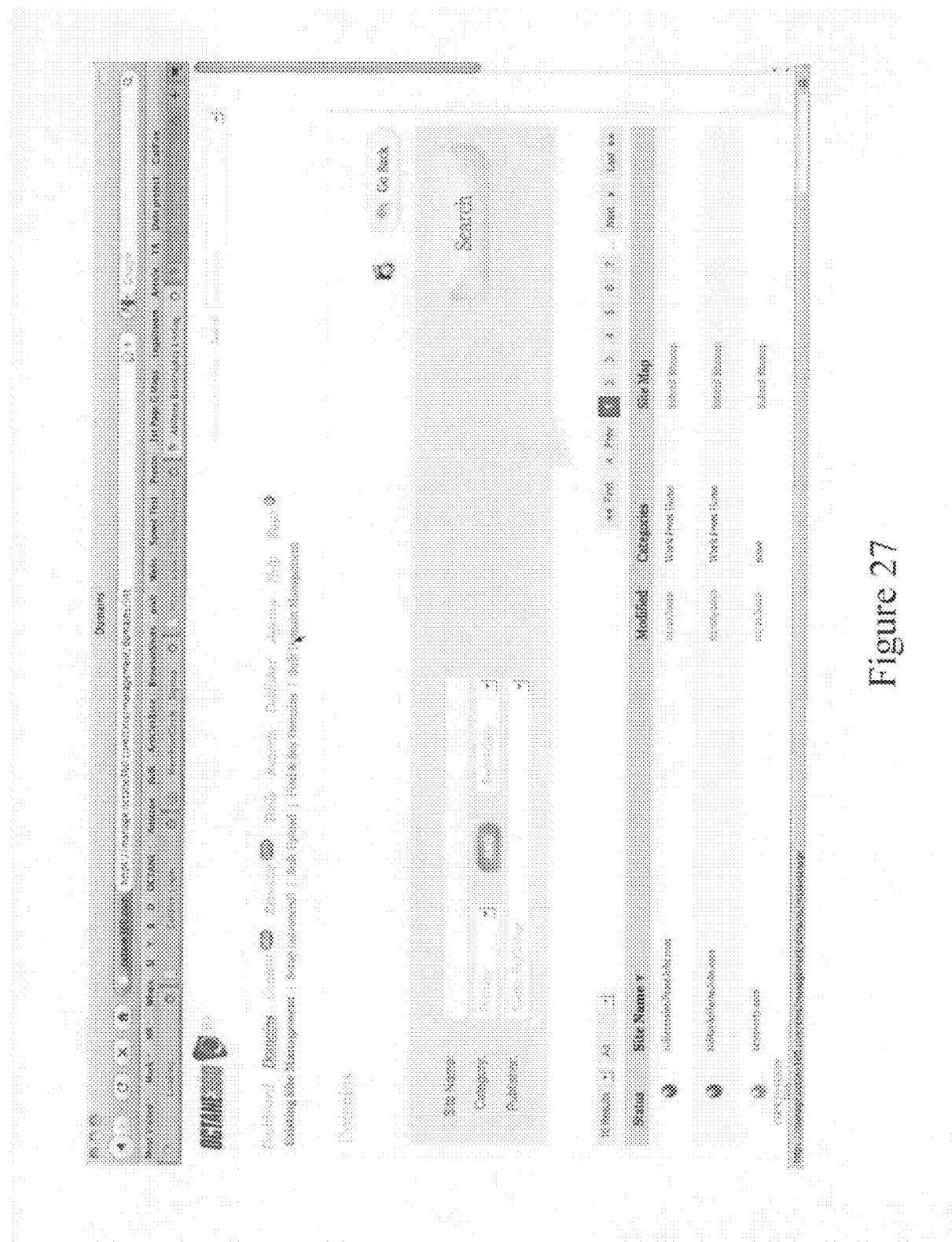
FIGS. 27-38 illustrate examples of the mass domain editing functionality of an example embodiment.
Figure 28:
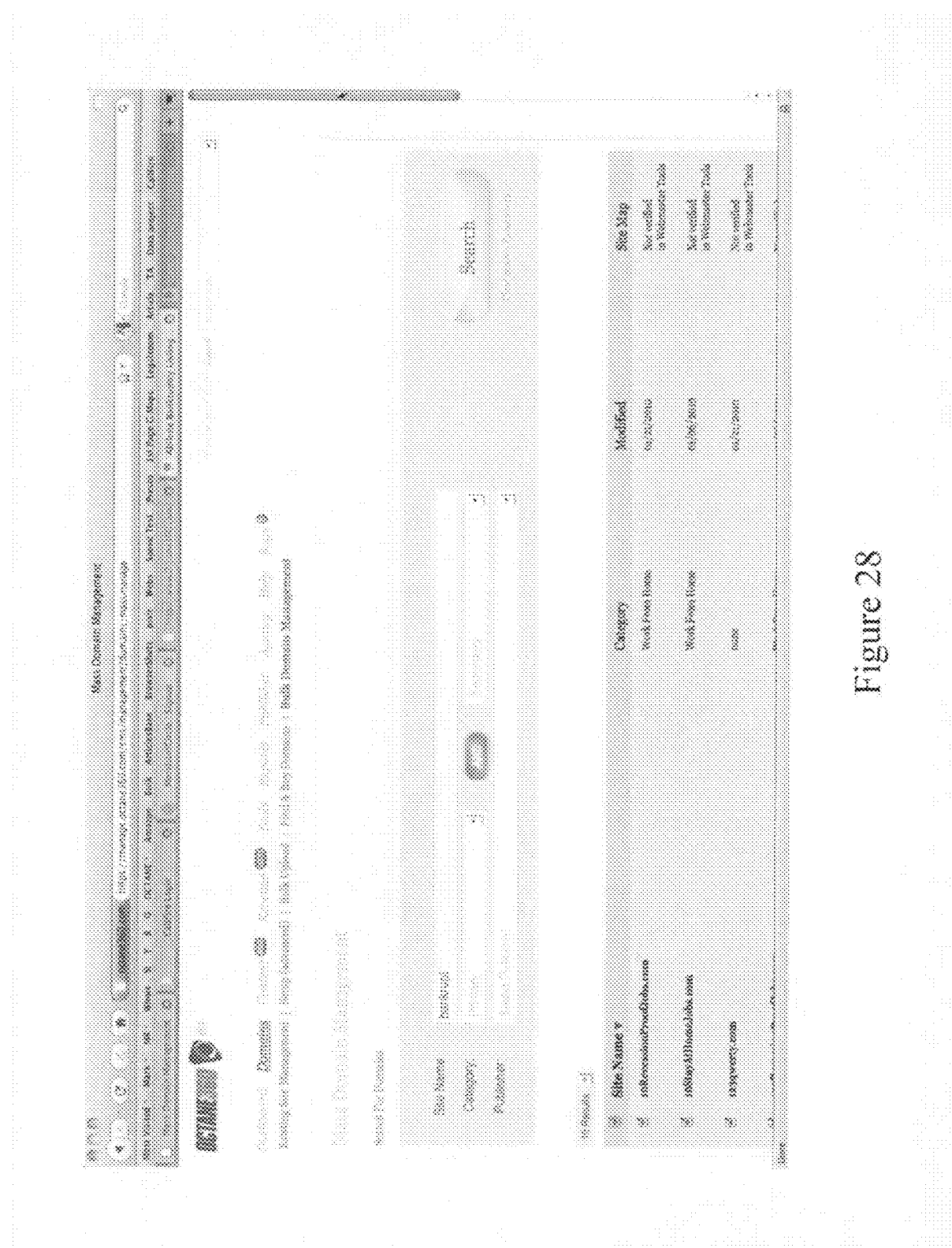
Figure 29:
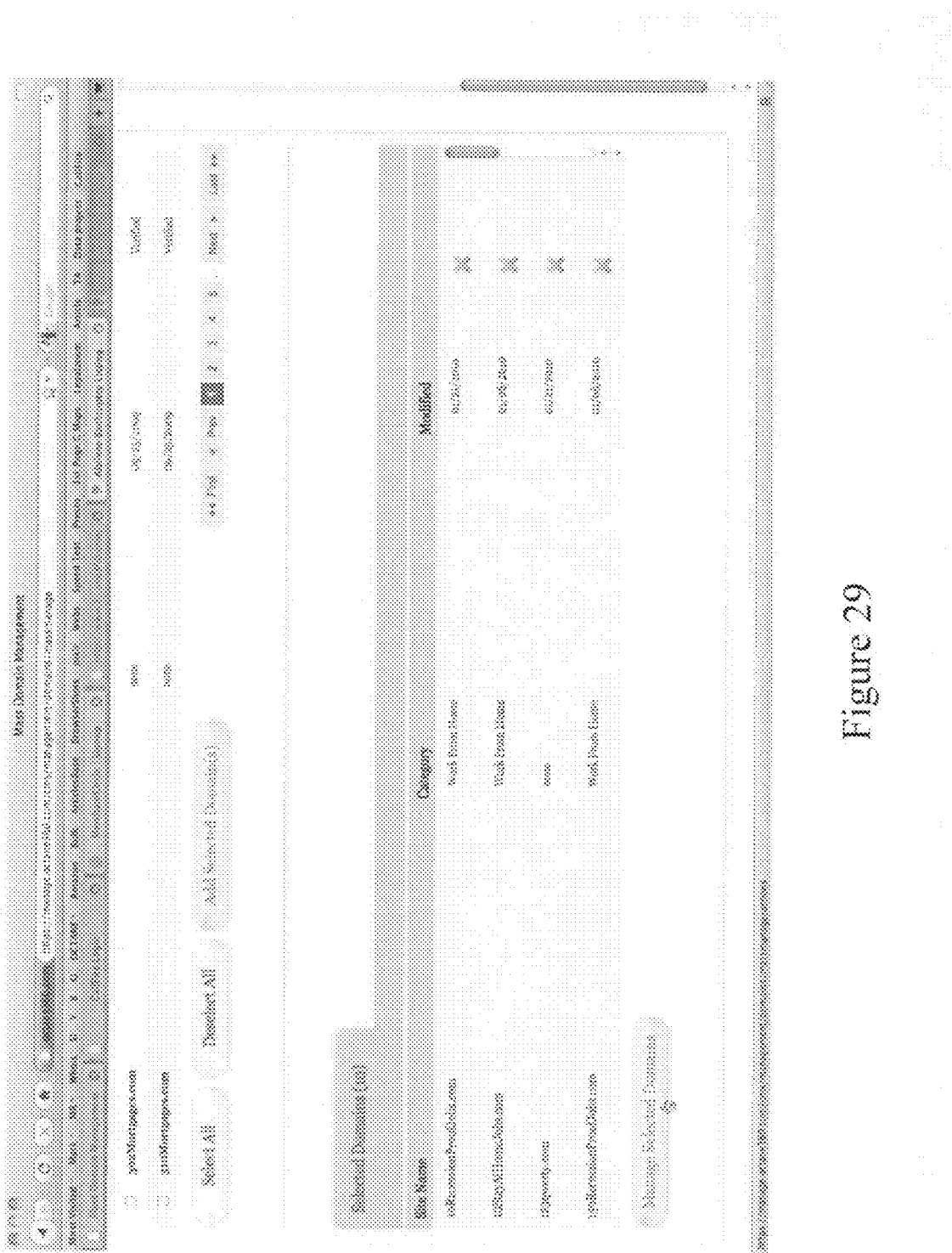
Figure 30:
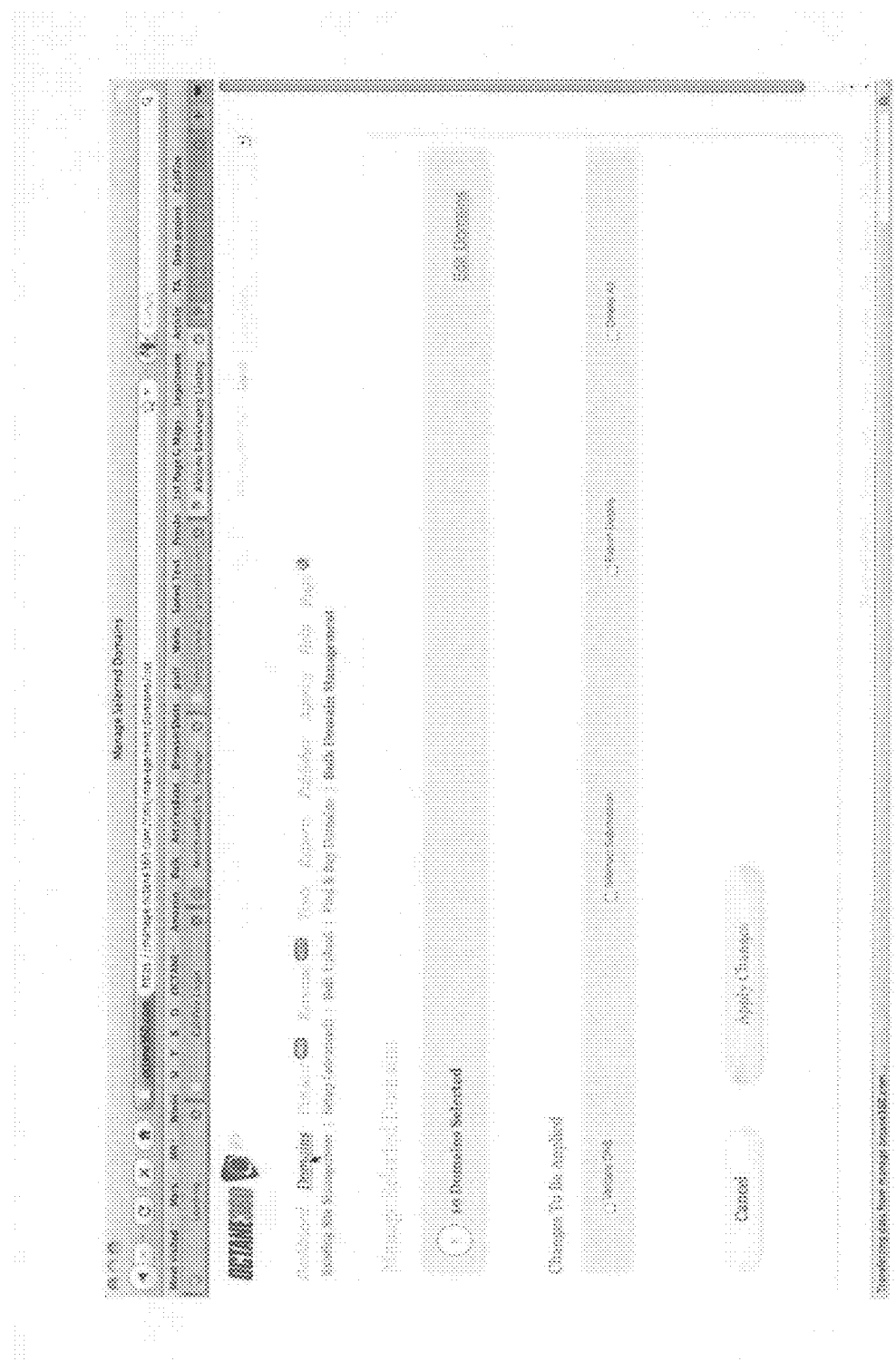
Figure 31:
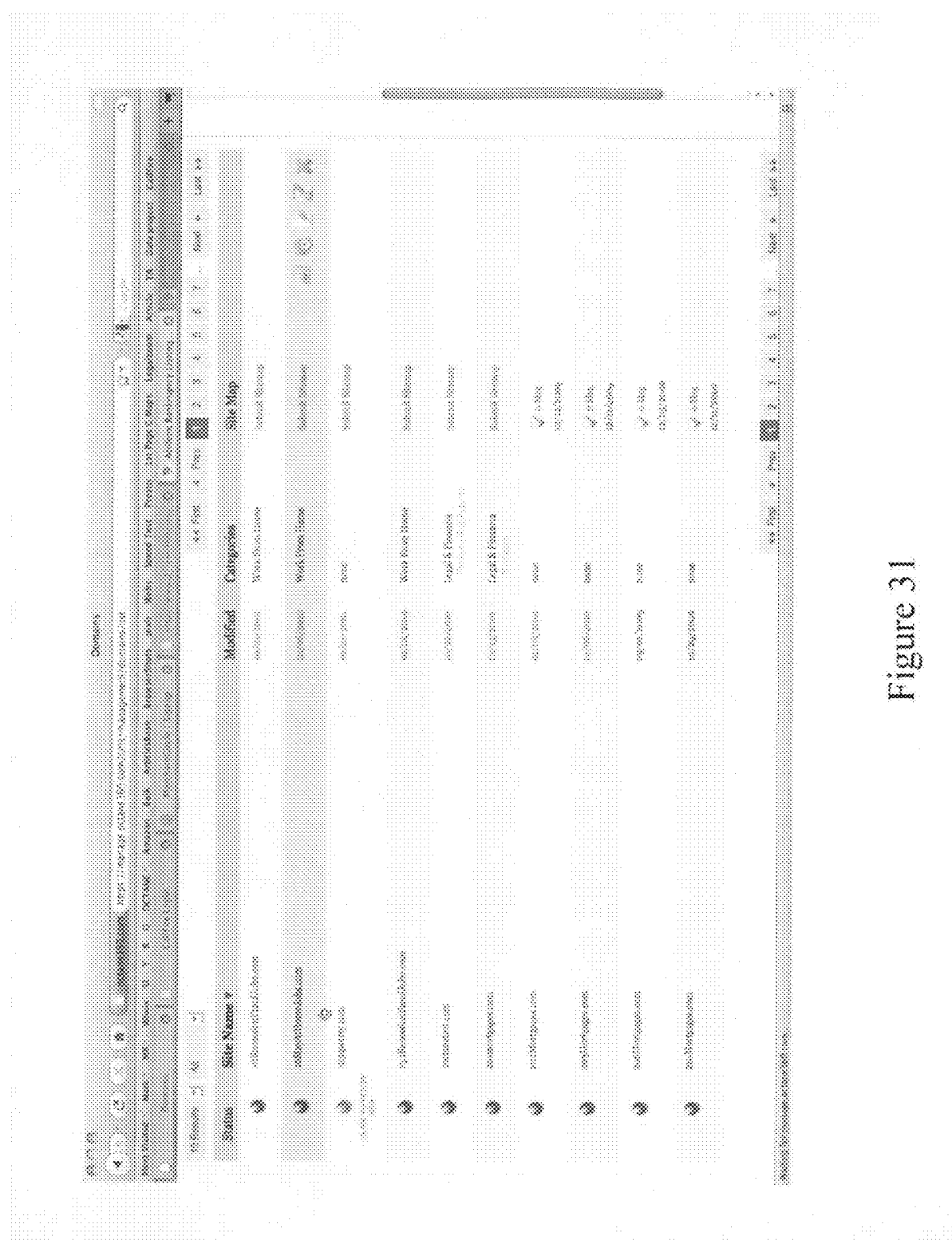

Referring now to FIGS. 27-38, examples illustrate the use of the mass domain management functionality of an example embodiment. Referring now to FIG. 27, a sample list of domains is shown having been selected by the user. The user may then select a 'Bulk Domain Management' function to invoke the mass domain management functionality of an example embodiment. As a result of selecting the mass domain management functionality, the user is presented with the sample user interface screen as shown in FIG. 28. The sample user interface screens shown in FIGS. 28 and 29 enable the user perform a domain search or otherwise select the set of domains to which configuration parameters or content changes will be applied by the mass domain management functionality. An example of the list of selected domains is shown in FIG. 29. Once the user selects the set of domains to which domain management changes will be applied, the user can select the 'Manage Selected Domains' button as shown in the example of FIG. 29. As a result of selecting the 'Manage Selected Domains' button, a user interface screen, such as the sample screen shown in FIG. 30 is presented to the user. The user interface shown in FIG. 30 provides a variety of bulk domain management tools 232 that can be applied in mass to the list of selected domains. For example, as shown in FIG. 30, the user can select to validate the domain name server, submit a sitemap, export details, or delete each domain in the list of selected domains using the selection options provided in the user interface of FIG. 30. Additionally, the user can select a button, 'Edit Domains', to invoke the bulk domain editor 231 provided by the bulk domain management component 230 of an example embodiment.

Figure 32:
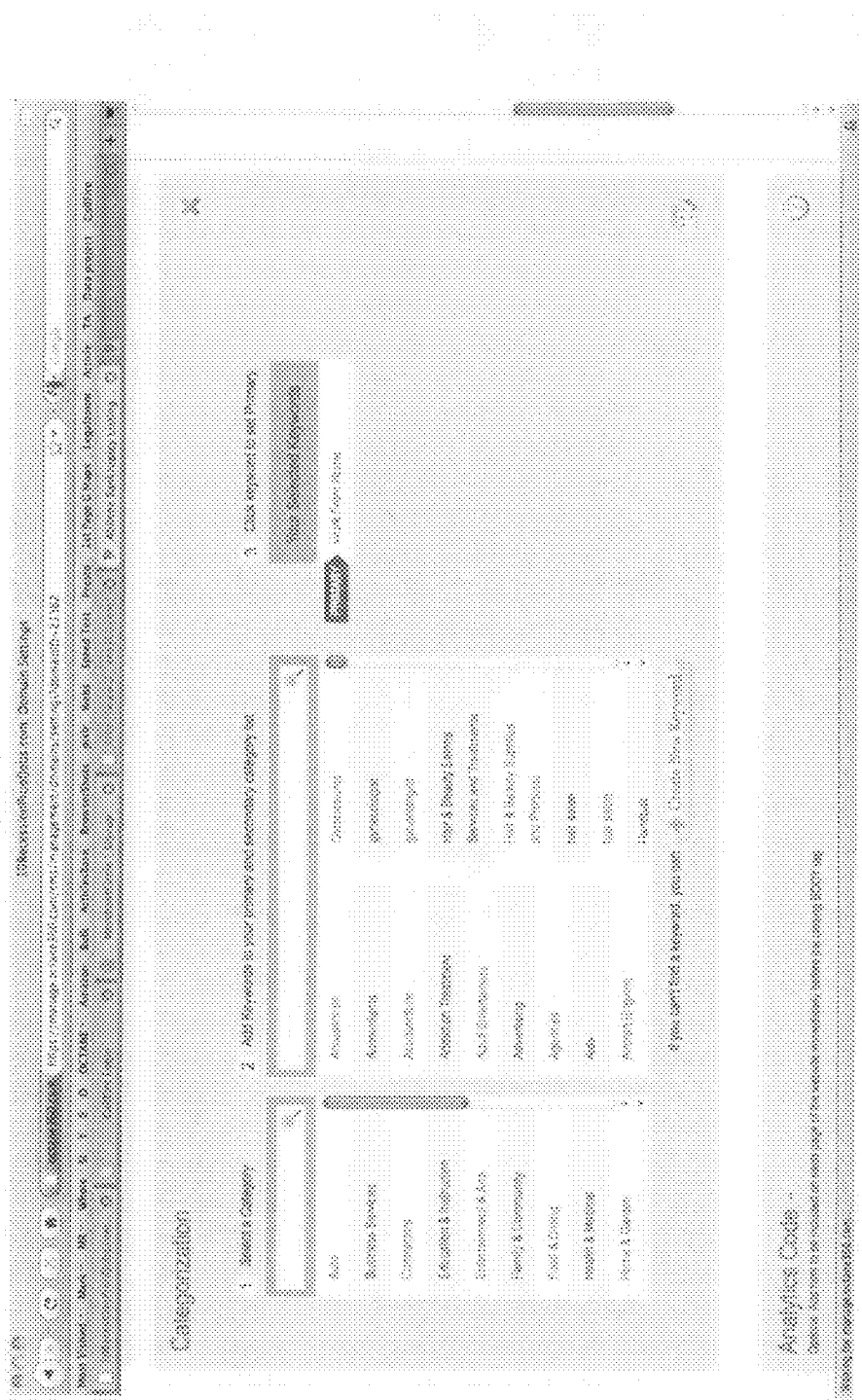
Figure 33:
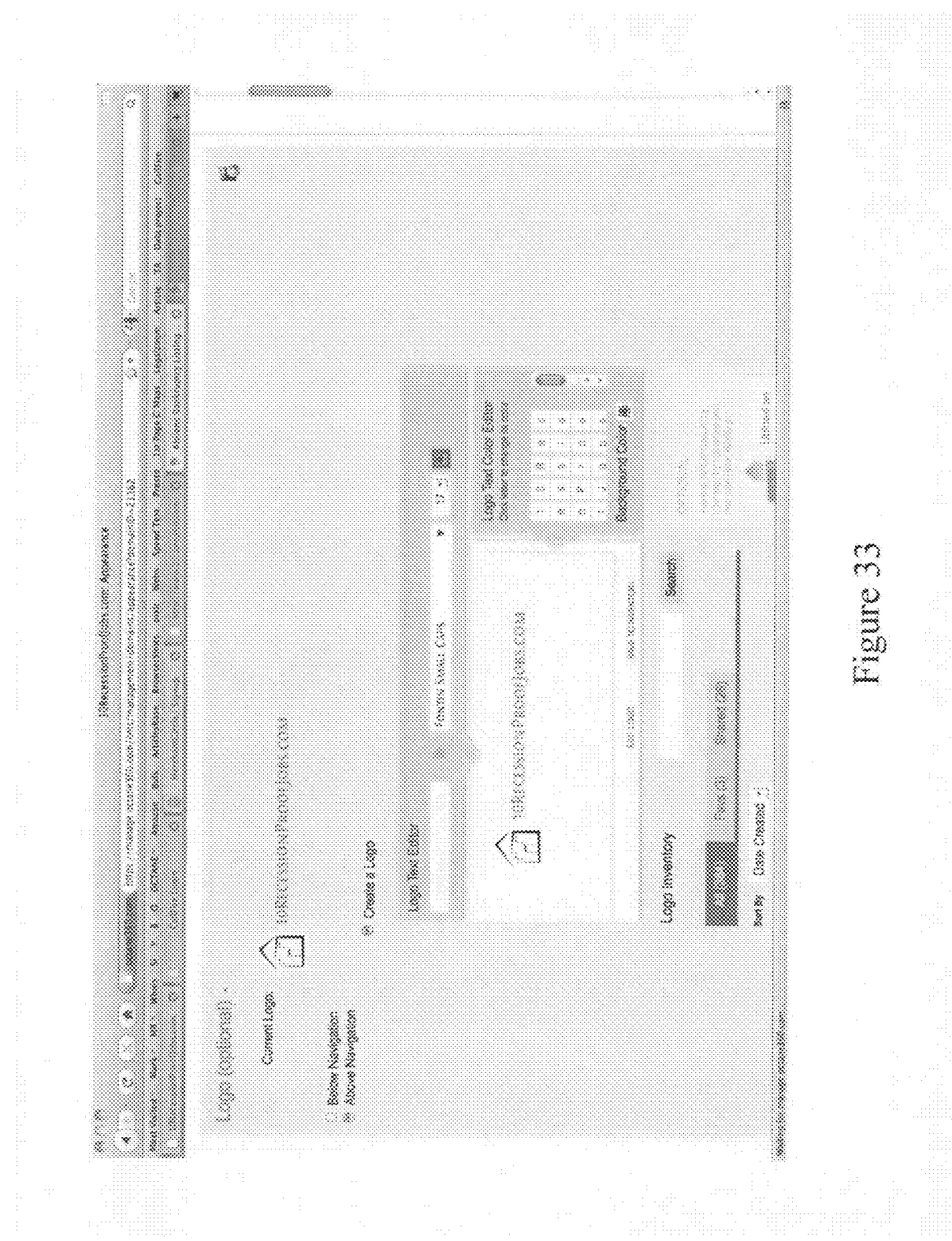
Figure 34:
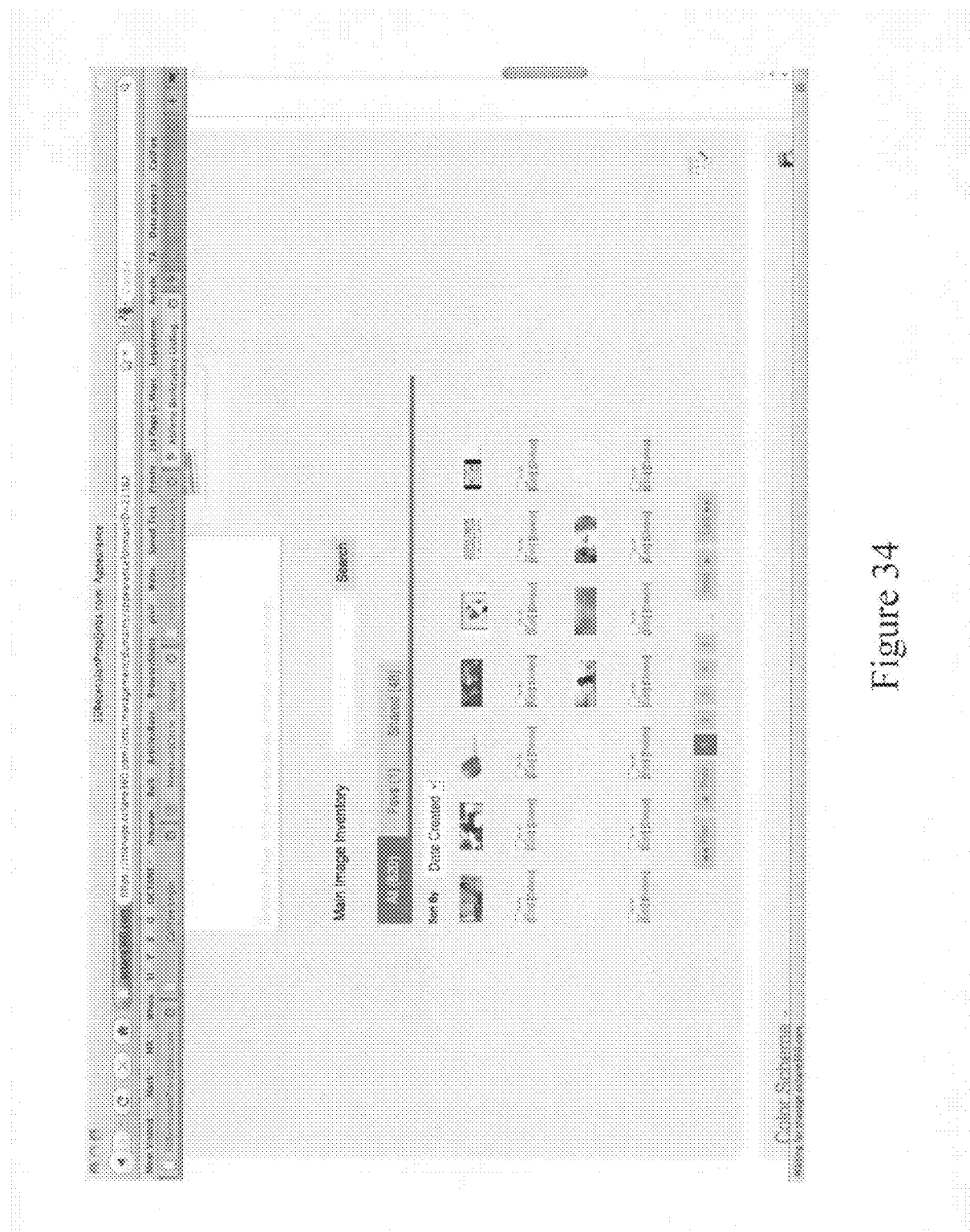
Figure 35:
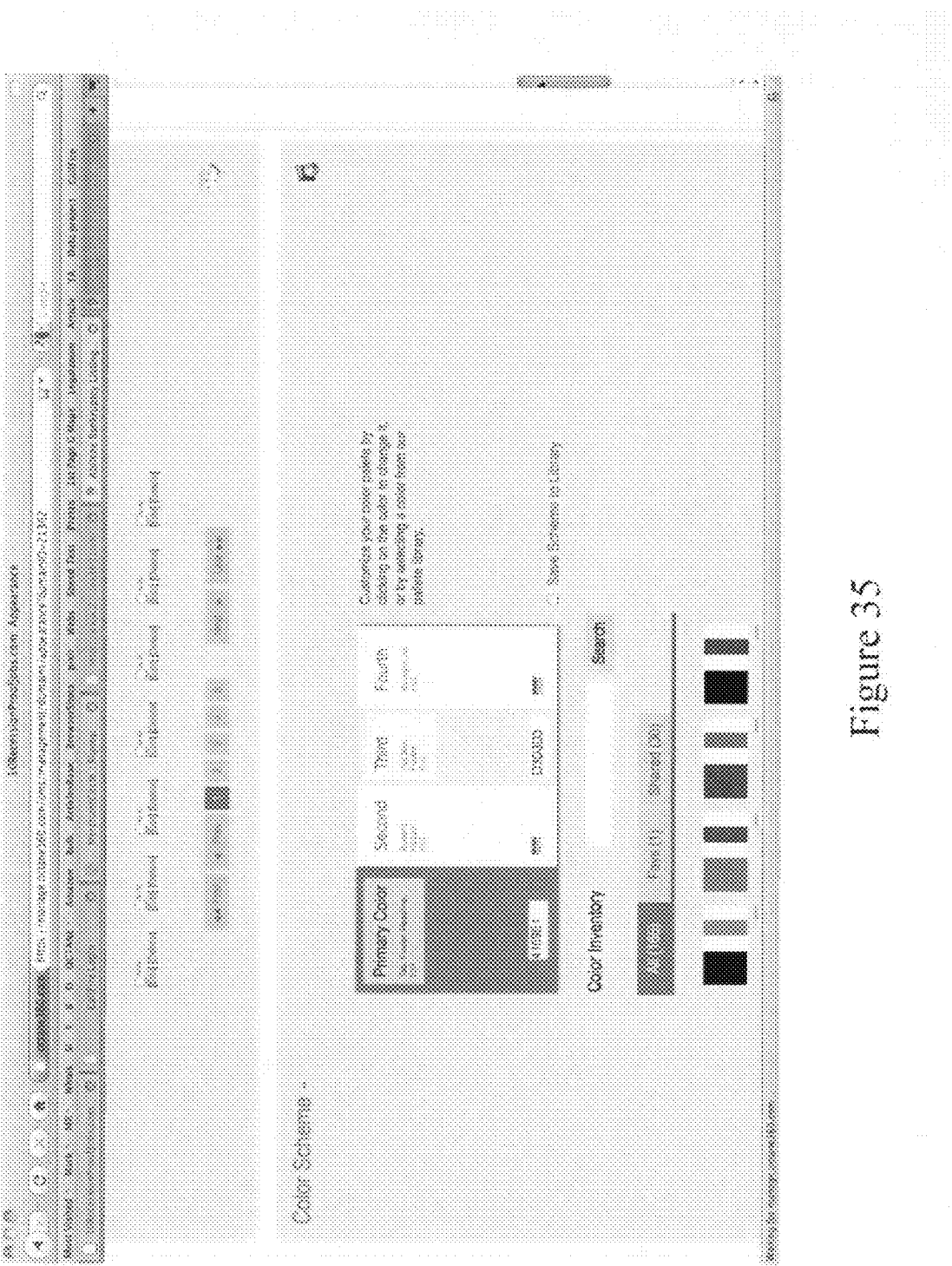
Figure 36:
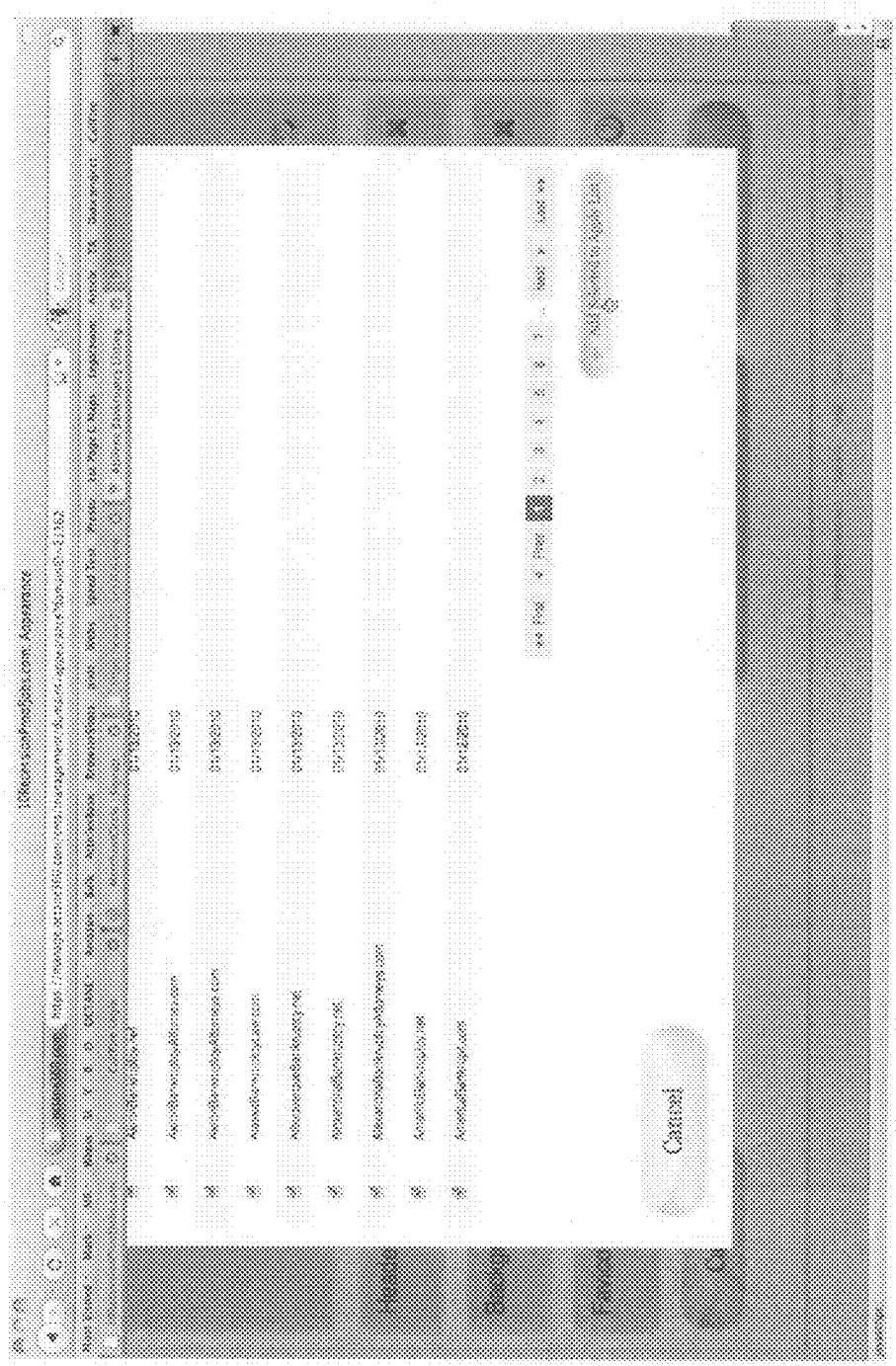

Referring now to FIG. 27, the sample list of domains is shown having been selected by the user. Using the bulk domain management tools 232 and/or the bulk domain editor 231, the user can modify a variety of domain parameters, domain configuration data, or domain content or meta data. For example, FIG. 32 illustrates a sample user interface with which a user can configure one or more categories and/or keywords associated with a set of domains. FIG. 33 illustrates a sample user interface with which a user can invoke a domain logo generator 228 to configure a unique logo or logo template associated with a set of domains. FIG. 34 illustrates a sample user interface with which a user can configure domain images associated with a set of domains. FIG. 35 illustrates a sample user interface with which a user can configure a color scheme associated with a set of domains. FIGS. 36-38 illustrate an example embodiment wherein the changes specified using the bulk domain management tools 232 and/or the bulk domain editor 231 are applied in mass to the set of domains in the list of selected domains.

Referring now to FIGS. 39-40 examples illustrate the advertising sales portal functionality of an example embodiment. In this example embodiment, a list of domains can be offered to advertisers, who can view the listed domains along with costs for advertising on each domain. Such a sample list of domains is shown in FIG. 39. Advertisers can search for a relevant set of domains using a search query, categorical browsing, and/or geographical filtering functionality provided in the sample user interface shown in FIG. 39. Once an advertiser identifies a set of selected domains, the advertiser can view a variety of domain advertising information regarding the selected domains as shown in FIG. 40. For example, the advertiser can determine ad listing positions for each domain, the domain purchase price, listing costs, and ranking information for each domain. The advertiser can then make purchases using the advertising sales portal and cause ads to be shown on the selected domains.

Figure 41:
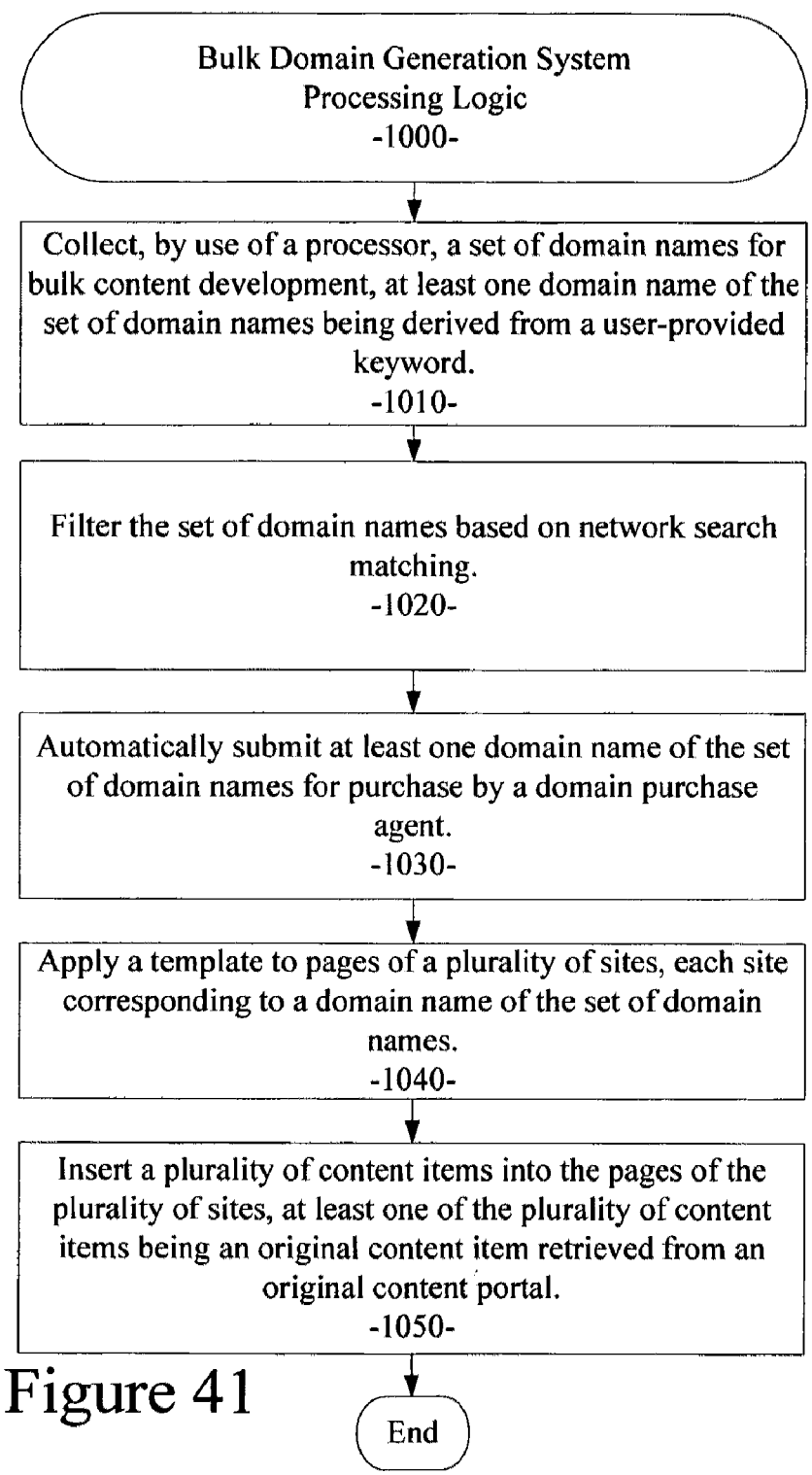
FIGS. 41-42 are processing flow charts illustrating example embodiments of a domain management system as described herein.
Figure 42:
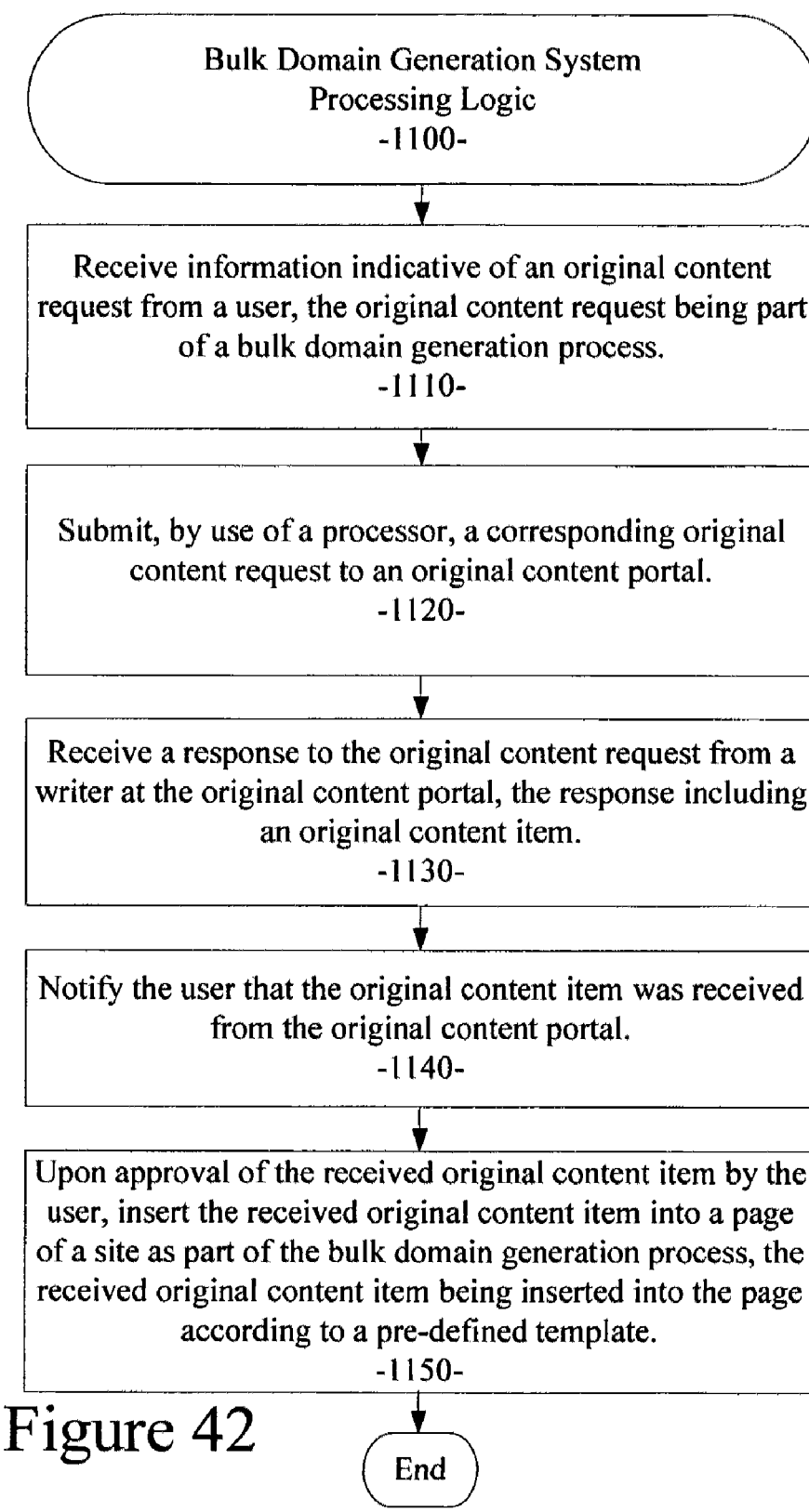

Referring now to FIGS. 41-42, processing flow diagrams illustrate example embodiments of a domain management system as described herein. The method of an example embodiment includes: collecting, by use of a processor, a set of domain names for bulk content development, at least one domain name of the set of domain names being derived from a user-provided keyword (processing block 1010); filtering the set of domain names based on network search matching (processing block 1020); automatically submitting at least one domain name of the set of domain names for purchase by a domain purchase agent (processing block 1030); applying a template to pages of a plurality of sites, each site corresponding to a domain name of the set of domain names (processing block 1040); and inserting a plurality of content items into the pages of the plurality of sites, at least one of the plurality of content items being an original content item retrieved from an original content portal (processing block 1050).

As shown in FIG. 42, another method of an example embodiment includes: receiving information indicative of an original content request from a user, the original content request being part of a bulk domain generation process (processing block 1110); submitting, by use of a processor, a corresponding original content request to an original content portal (processing block 1120); receiving a response to the original content request from a writer at the original content portal, the response including an original content item (processing block 1130); notifying the user that the original content item was received from the original content portal (processing block 1140); and upon approval of the received original content item by the user, inserting the received original content item into a page of a site as part of the bulk domain generation process, the received original content item being inserted into the page according to a pre-defined template (processing block 1150).

Figure 43:
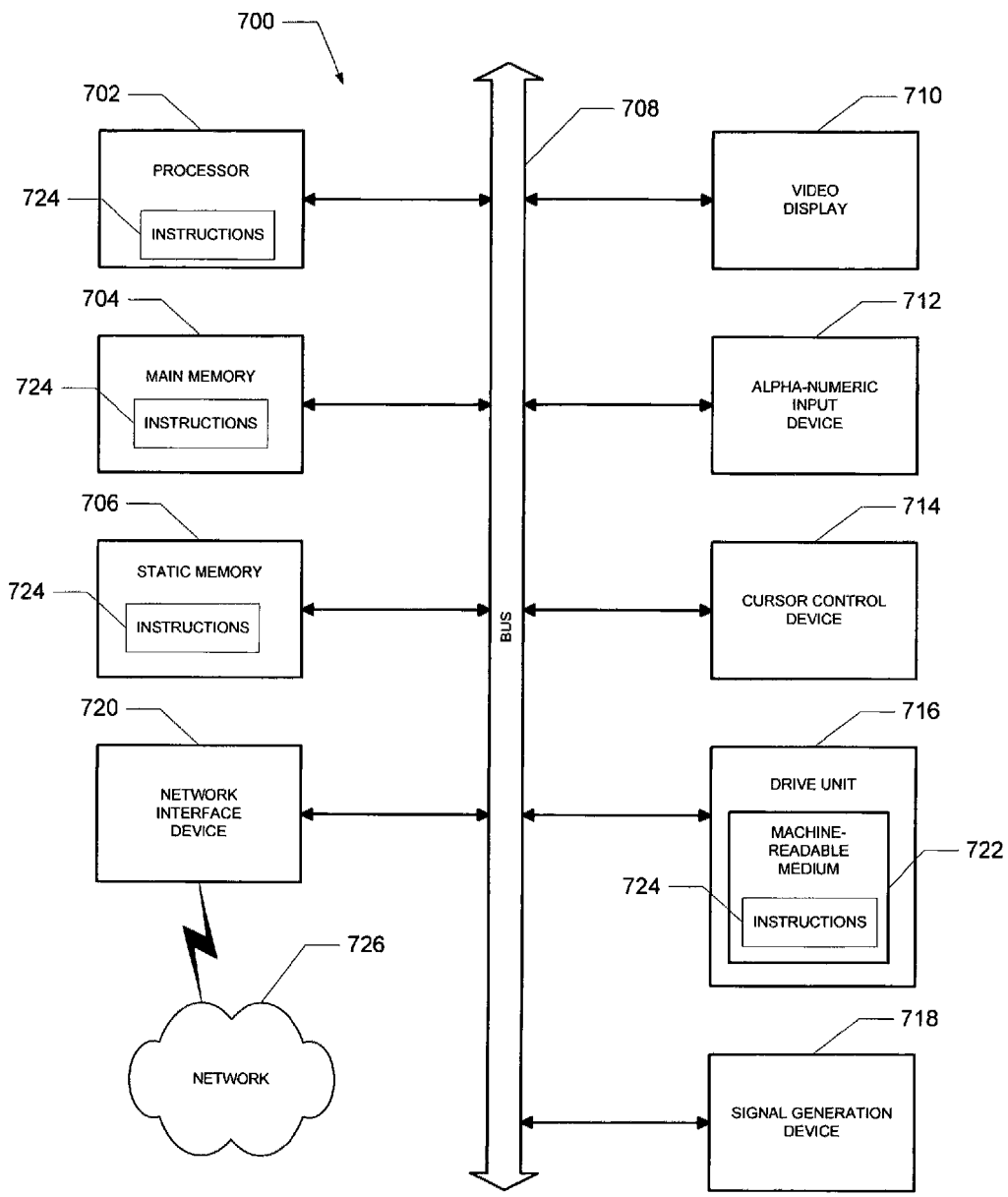
FIG. 43 shows a diagrammatic representation of machine in the example form of a computer system within which a set of instructions when executed may cause the machine to perform any one or more of the methodologies discussed herein.

FIG. 43 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A computer-implemented method, comprising:
    collecting, by use of a processor, a set of domain names for bulk content development, at least one domain name of the set of domain names being derived from a user-provided keyword;
    filtering the set of domain names based on network search matching from searches made by network users, the searches made for a plurality of domain names in the set of domain names;
    automatically submitting at least one domain name of the set of domain names for purchase by a domain purchase agent;
    applying a template to pages of a plurality of sites, each site corresponding to a domain name of the set of domain names; and
    inserting a plurality of content items into the pages of the plurality of sites, at least one of the plurality of content items being an original content item retrieved from an original content portal.

2. The method as claimed in claim 1 wherein at least one domain name of the set of domain names being a domain name previously purchased by a user.

3. The method as claimed in claim 1 wherein at least one domain name of the set of domain names being a specifically identified by a user.

4. The method as claimed in claim 1 including filtering the set of domain names based on a user context.

5. The method as claimed in claim 1 wherein filtering the set of domain names based on network search matching including accessing a search engine to obtain information related to a plurality of related search queries.

6. The method as claimed in claim 1 wherein the user-provided keyword is a keyword phrase.

7. The method as claimed in claim 1 wherein the template specifies the layout for at least one page of the plurality of sites.

8. The method as claimed in claim 1 wherein the original content portal includes an interface through which a writer can submit the original content item.

9. A system, comprising:
   a processor;
   a database, in data communication with the processor, for storage of domain information; and
   a domain management module, executable by the processor, to:
      collect a set of domain names for bulk content development, at least one domain name of the set of domain names being derived from a user-provided keyword;
      filter the set of domain names based on network search matching from searches made by network users, the searches made for a plurality of domain names in the set of domain names;
      automatically submit at least one domain name of the set of domain names for purchase by a domain purchase agent;
      apply a template to pages of a plurality of sites, each site corresponding to a domain name of the set of domain names; and
      insert a plurality of content items into the pages of the plurality of sites, at least one of the plurality of content items being an original content item retrieved from an original content portal.

10. The system as claimed in claim 9 wherein at least one domain name of the set of domain names being a domain name previously purchased by a user.

11. The system as claimed in claim 9 wherein at least one domain name of the set of domain names being a specifically identified by a user.

12. The system as claimed in claim 9 being further configured to filter the set of domain names based on a user context.

13. The system as claimed in claim 9 being further configured to access a search engine to obtain information related to a plurality of related search queries.

14. The system as claimed in claim 9 wherein the user-provided keyword is a keyword phrase.

15. The system as claimed in claim 9 wherein the template specifies the layout for at least one page of the plurality of sites.

16. The system as claimed in claim 9 wherein the original content portal includes an interface through which a writer can submit the original content item.

17. A non-transitory machine-useable storage medium embodying instructions which, when executed by a machine, cause the machine to:
   collect a set of domain names for bulk content development, at least one domain name of the set of domain names being derived from a user-provided keyword;
   filter the set of domain names based on network search matching from searches made by network users, the searches made for a plurality of domain names in the set of domain names;
   automatically submit at least one domain name of the set of domain names for purchase by a domain purchase agent;
   apply a template to pages of a plurality of sites, each site corresponding to a domain name of the set of domain names; and
   insert a plurality of content items into the pages of the plurality of sites, at least one of the plurality of content items being an original content item retrieved from an original content portal.

18. The machine-useable storage medium as claimed in claim 17 being further configured to access a search engine to obtain information related to a plurality of related search queries.

19. The machine-useable storage medium as claimed in claim 17, wherein the original content item is in one of XML, HTML, PDF, MP3, MP4, or Atom.

* * * * *